United States Patent
Mitra et al.

(10) Patent No.: US 10,268,486 B1
(45) Date of Patent: Apr. 23, 2019

(54) EXPEDITED RESUME PROCESS FROM HIBERNATION

(71) Applicant: Amazon Technologies, Inc., Seattle, WA (US)

(72) Inventors: Somnath Mitra, Pleasanton, CA (US); Robert Joseph Suk, Santa Clara, CA (US); Mitchell Bernard Skiba, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 40 days.

(21) Appl. No.: 15/081,318

(22) Filed: Mar. 25, 2016

(51) Int. Cl.
*G06F 9/4401* (2018.01)
*G06F 1/32* (2006.01)
*G06F 3/06* (2006.01)

(52) U.S. Cl.
CPC ............. *G06F 9/4418* (2013.01); *G06F 1/32* (2013.01); *G06F 3/0625* (2013.01); *G06F 3/0632* (2013.01); *G06F 3/0659* (2013.01); *G06F 3/0685* (2013.01)

(58) Field of Classification Search
CPC ........ G06F 9/4418; G06F 1/32; G06F 3/0625; G06F 3/0632; G06F 3/0659; G06F 3/0685
See application file for complete search history.

(56) References Cited

U.S. PATENT DOCUMENTS

| | | | |
|---|---|---|---|
| 2012/0131368 A1* | 5/2012 | Yang | G06F 1/3206 713/323 |
| 2013/0227325 A1 | 8/2013 | Konosu | |
| 2015/0198998 A1* | 7/2015 | Nanda | G06F 1/3234 713/323 |
| 2016/0073351 A1* | 3/2016 | Cardozo | H04W 52/0258 455/574 |

OTHER PUBLICATIONS

Wikipedia, Electronic Paper, Dec. 14, 2015, Wikipedia.org, the version archived by web.archive.org on Dec. 14, 2015.*
Yamada, Kannon, Disable Hibernate on Your SSD for Warranty Purposes, http://makeuseof.com/tag/disable-hibernate-ssd-warranty-purposes/, Oct. 26, 2014.
Non-Final Office Action issued in U.S. Appl. No. 15/081,382 dated Sep. 27, 2017.

* cited by examiner

*Primary Examiner* — Austin Hicks
(74) *Attorney, Agent, or Firm* — Pierce Atwood LLP

(57) ABSTRACT

Devices, systems and methods are disclosed for readying a device from hibernation with reduced user-perceived latency. For example, data likely to be accessed may be selected as preload data that is loaded into volatile memory prior to the device resuming system interactivity (e.g., being responsive to user input), thus "anticipating" user demand by loading memory pages that the user will likely request. The device may determine additional data to add to the preload data based on processes running on the device and virtual memory areas (VMAs) associated with the processes, (Continued)

may weight the processes and may intelligently determine the data so that the device more rapidly reaches system interactivity.

21 Claims, 21 Drawing Sheets

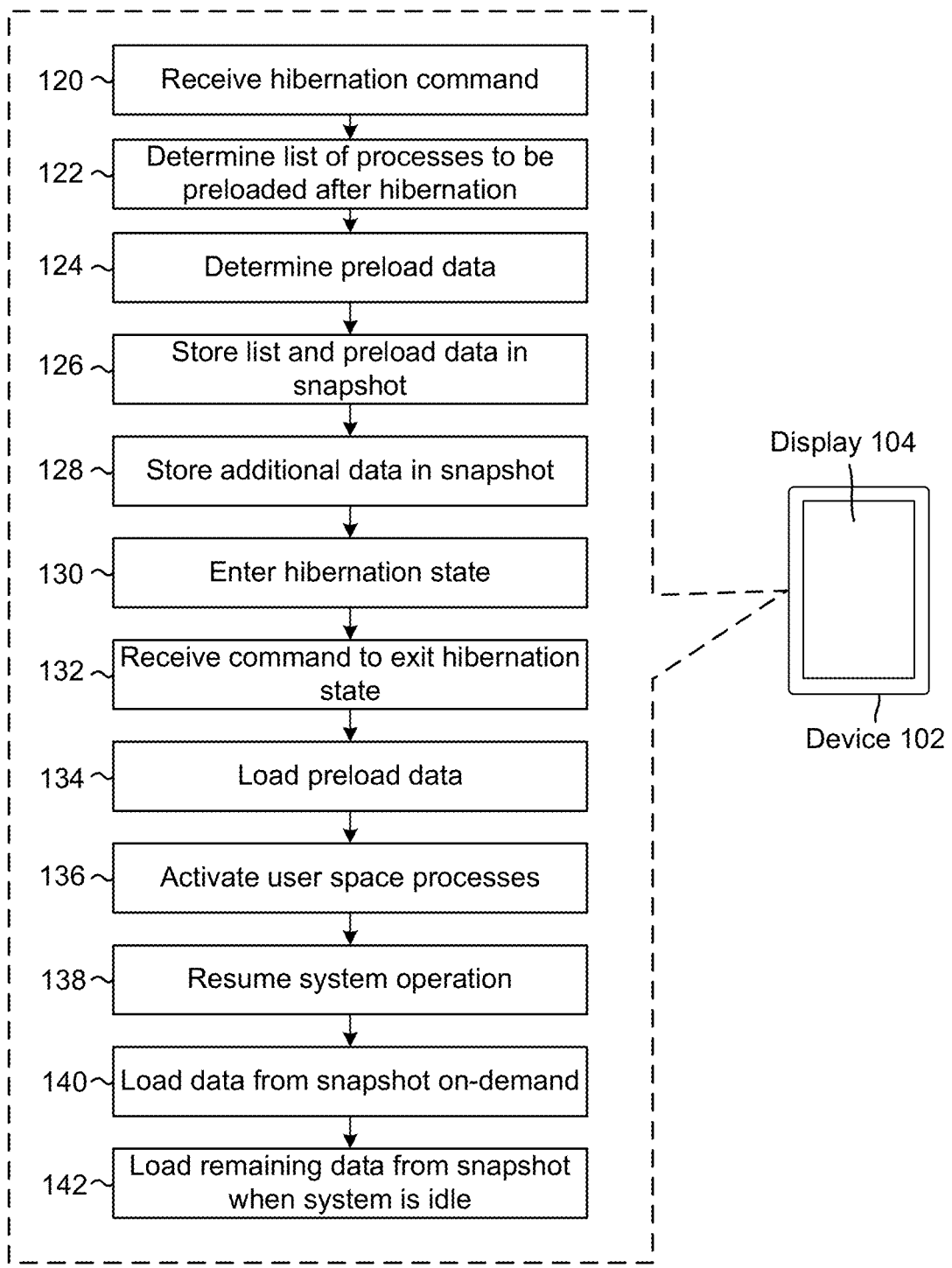

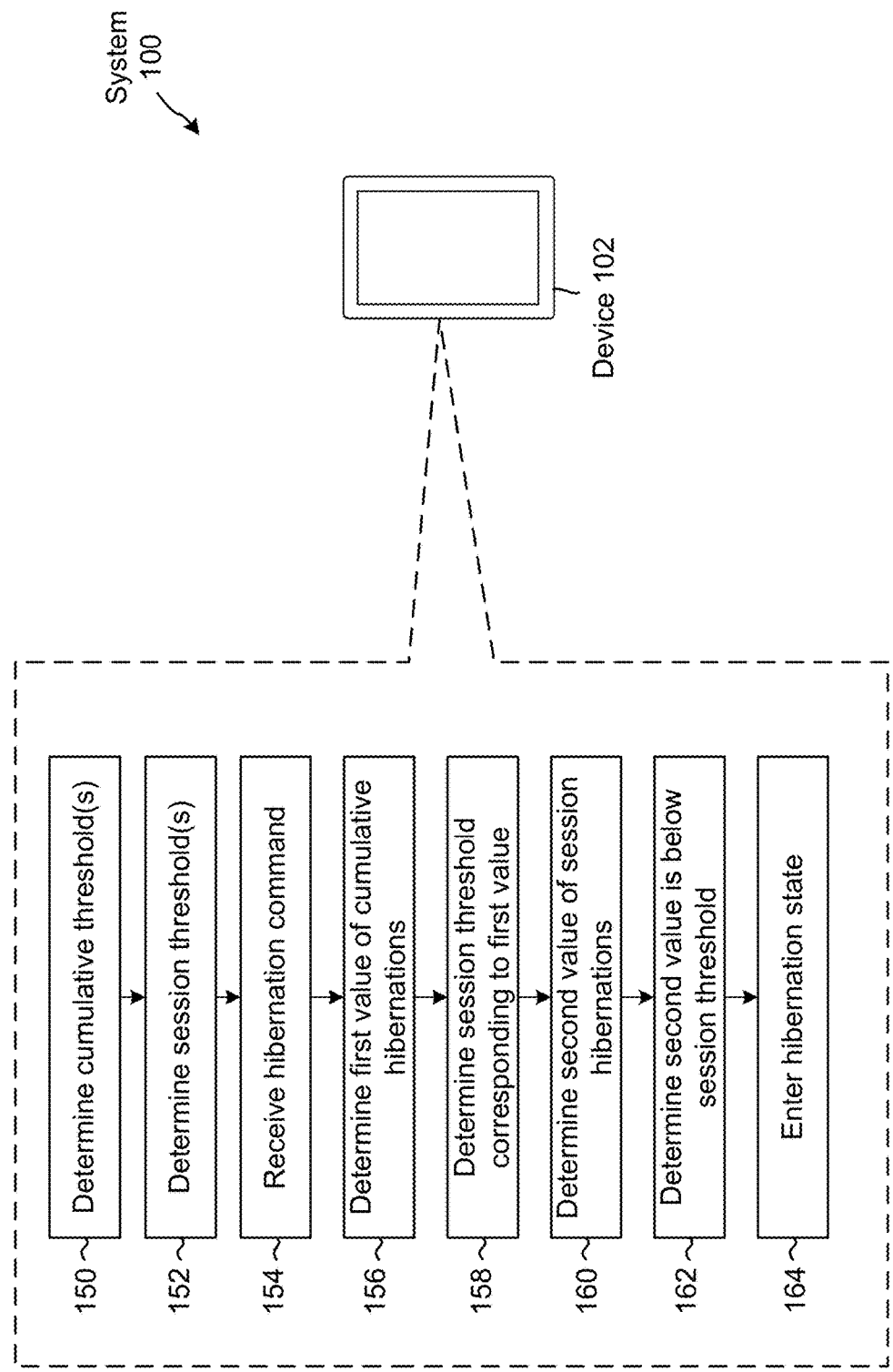

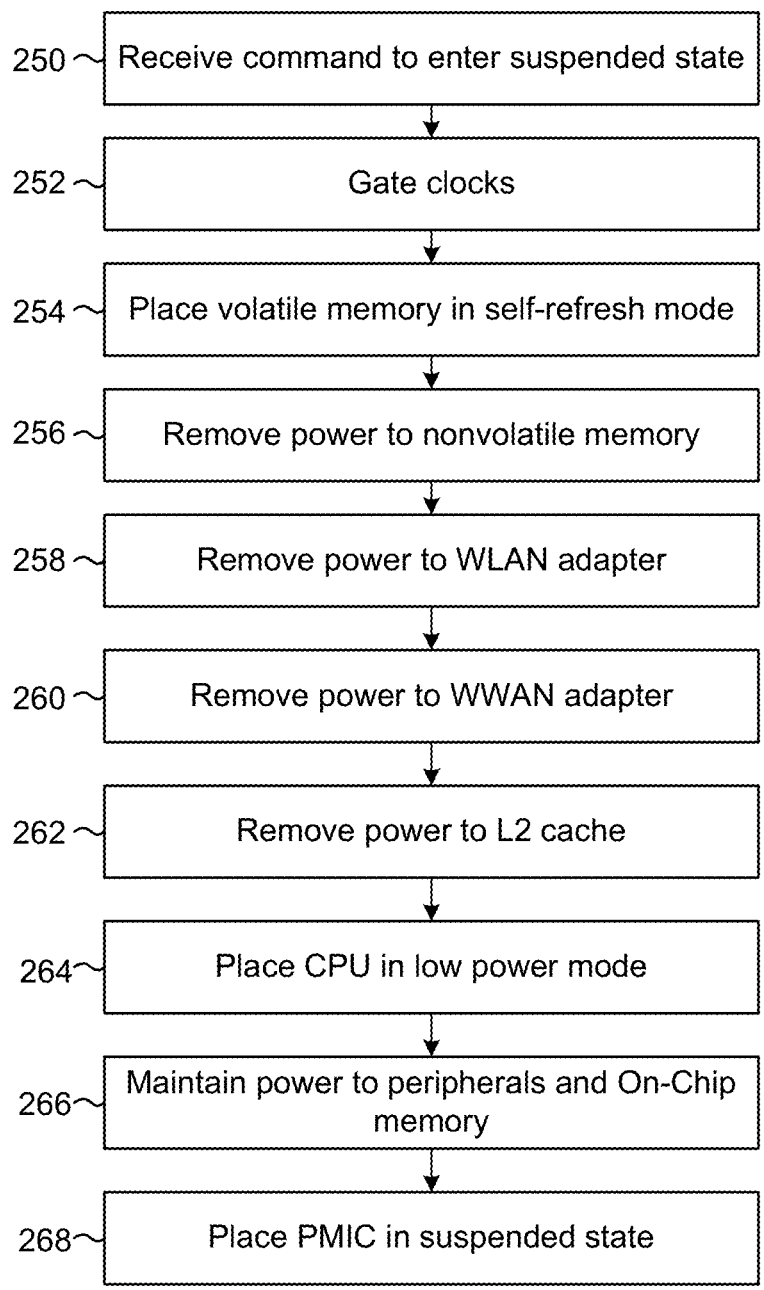

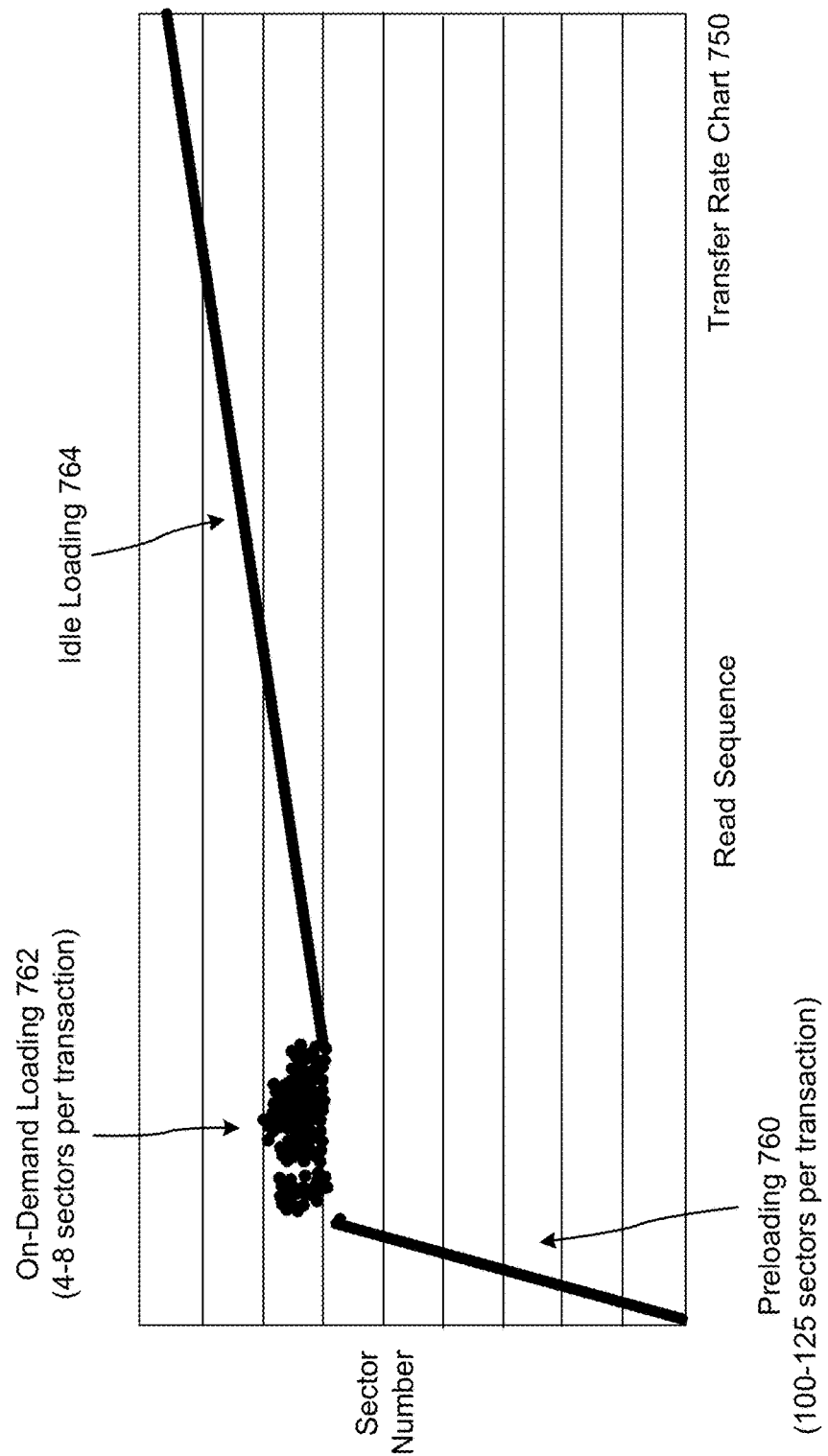

FIG. 10A
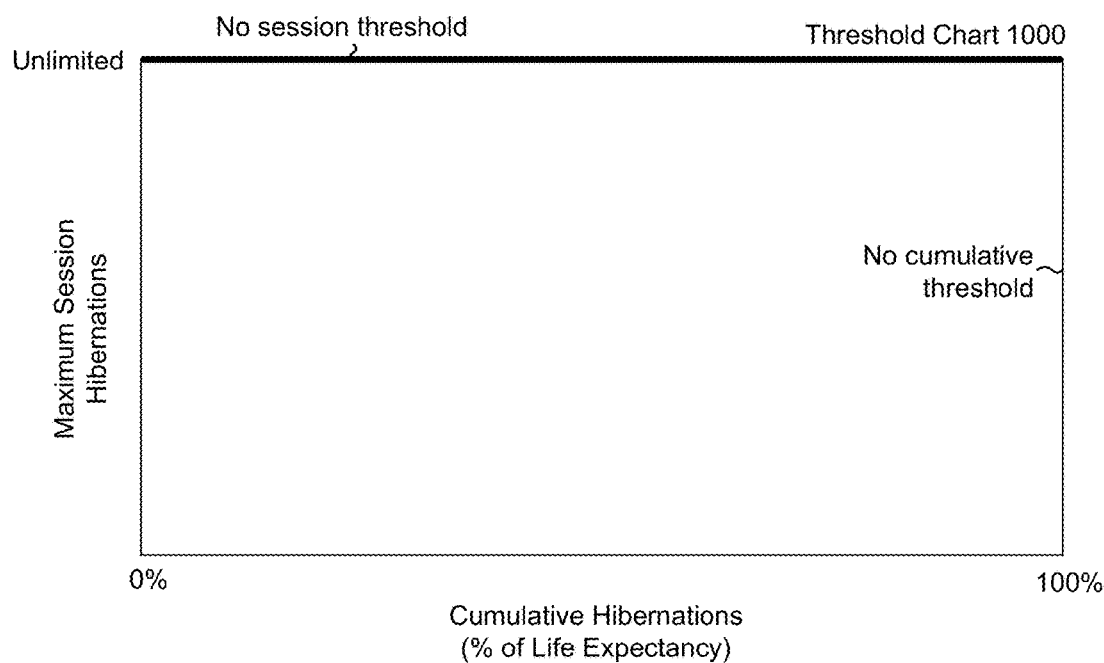
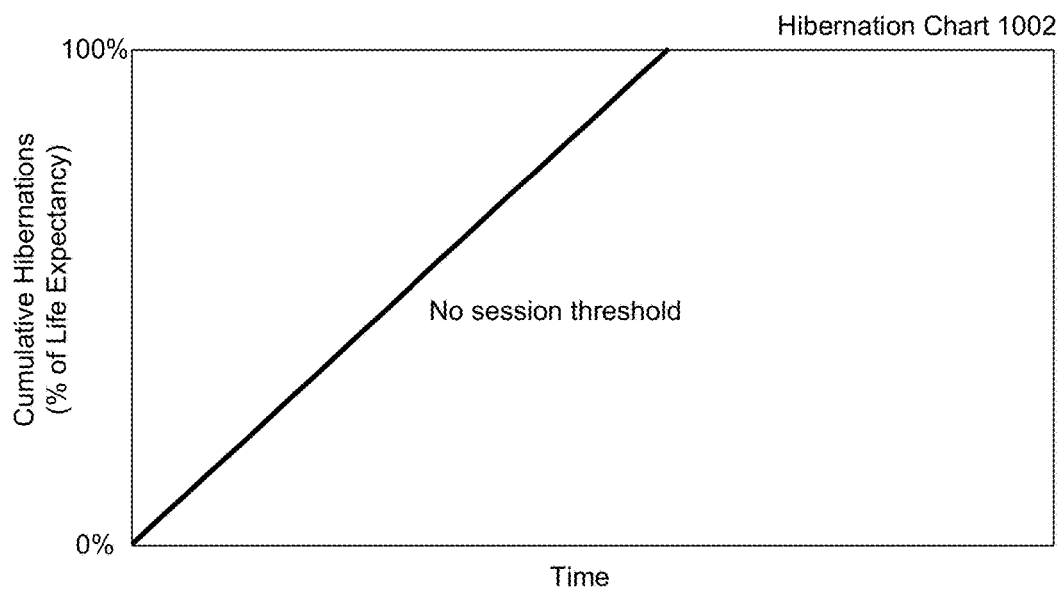

FIG. 10B
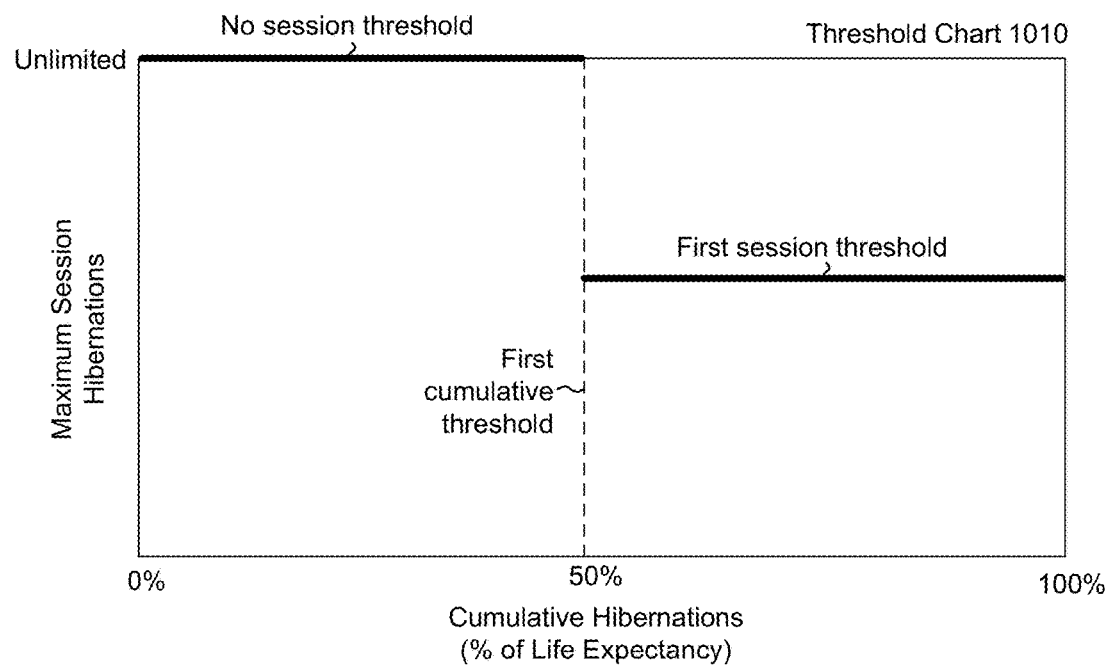
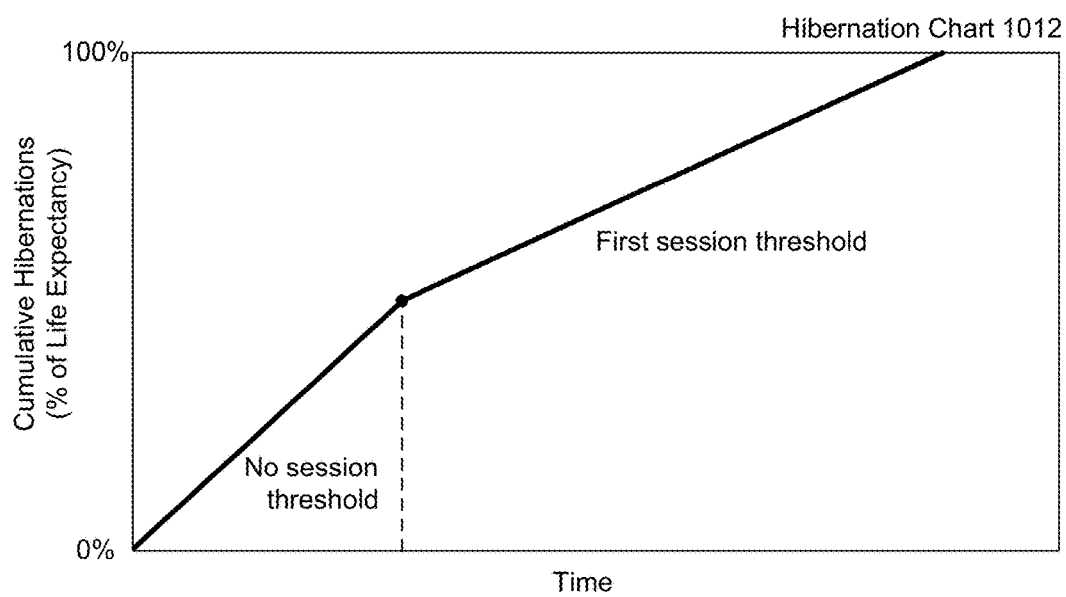

FIG. 10C
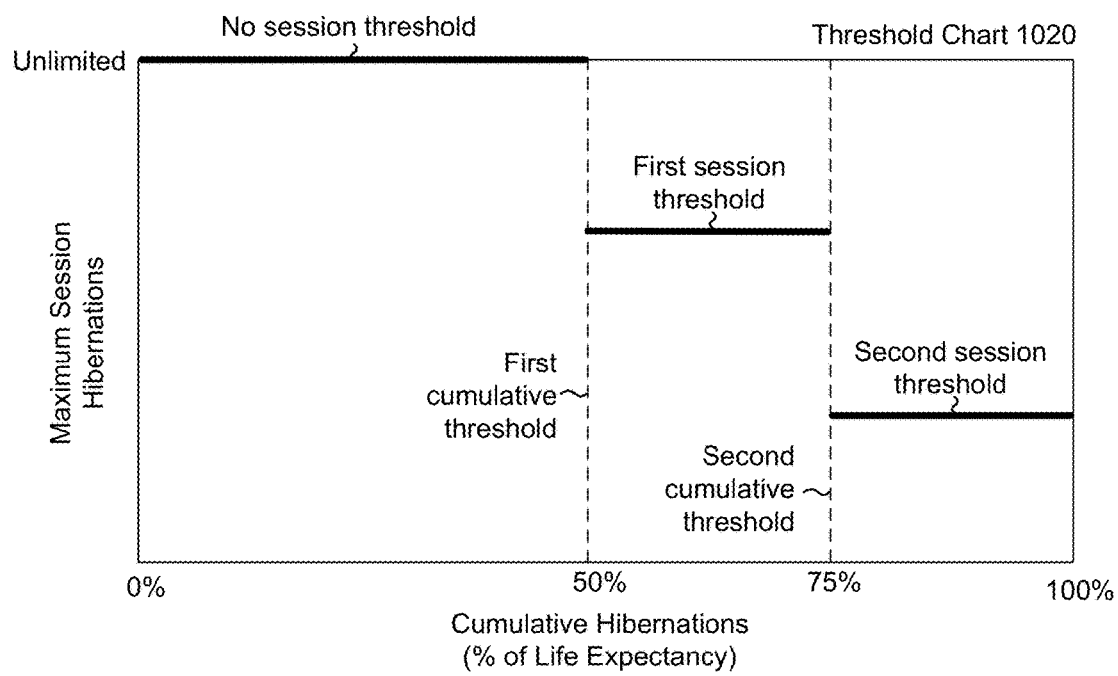
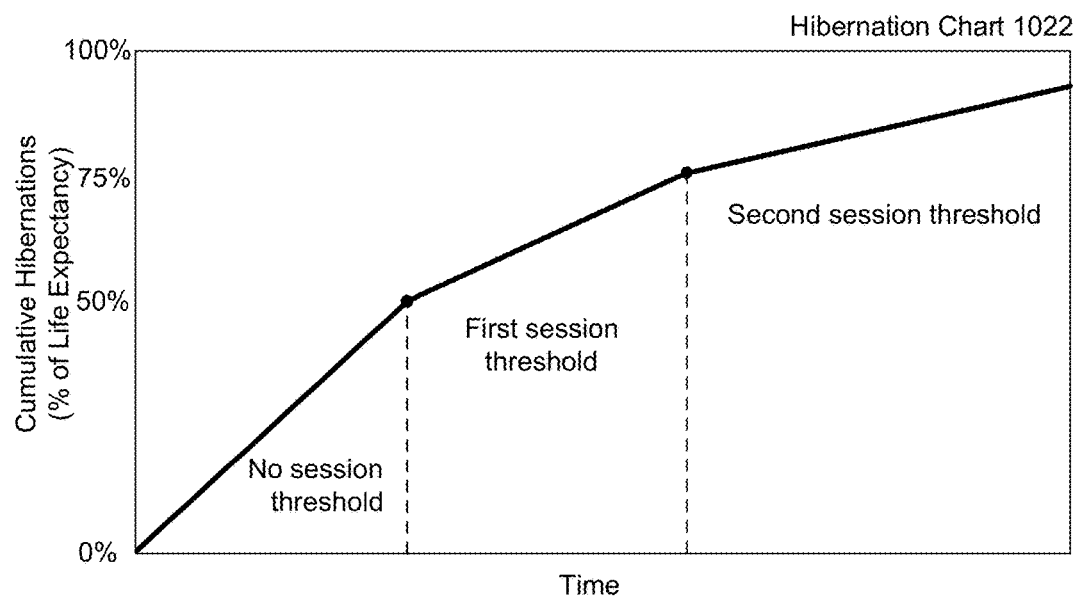

FIG. 10D
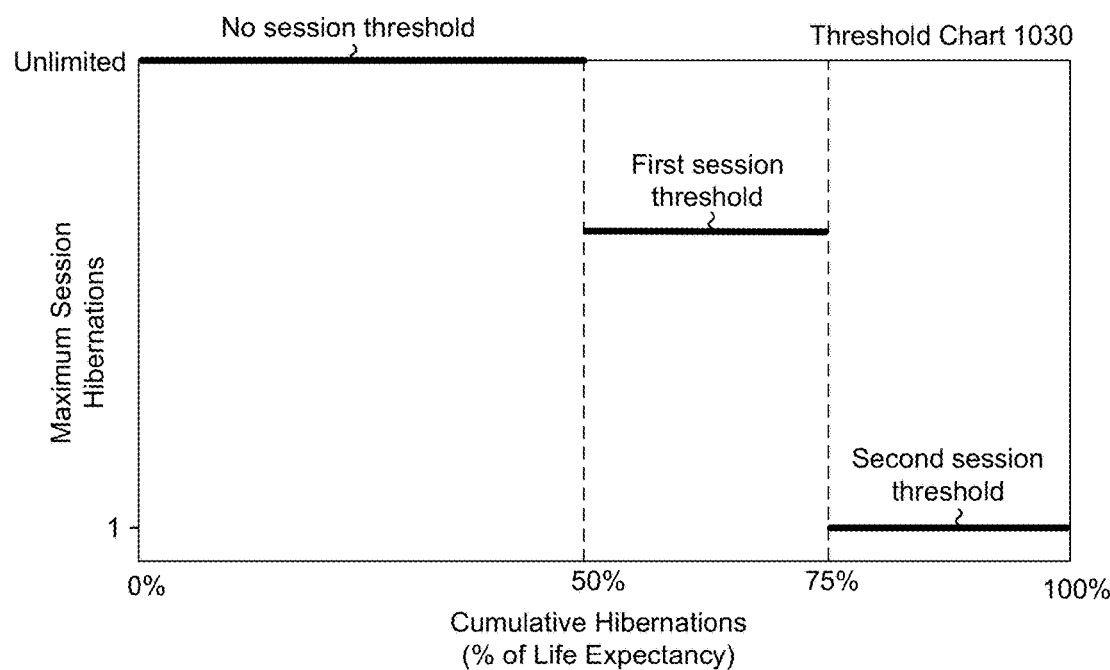
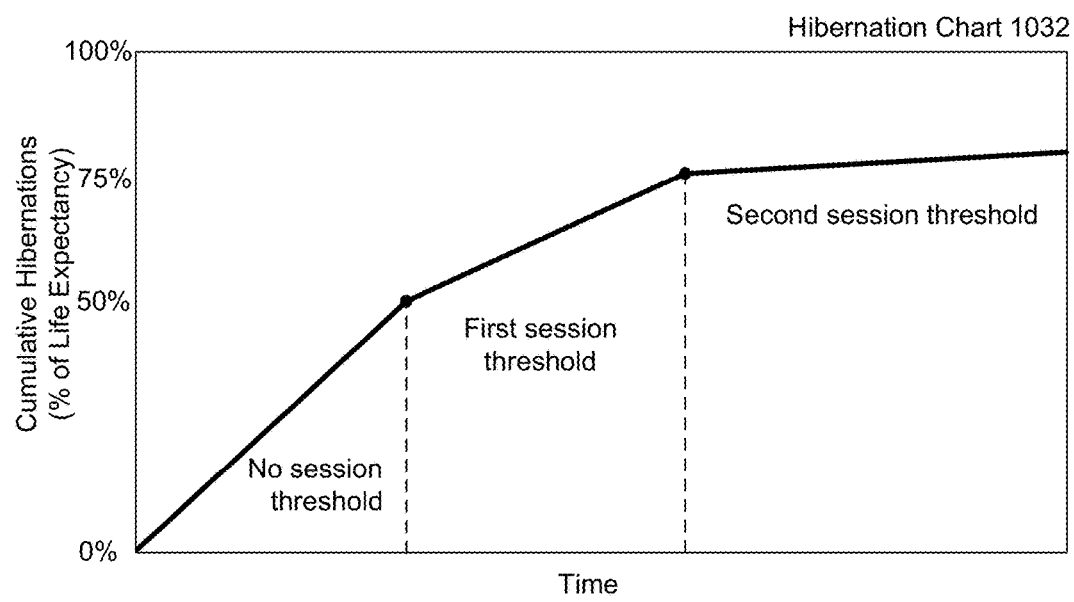

EXPEDITED RESUME PROCESS FROM HIBERNATION

BACKGROUND

With the advancement of technology, the use and popularity of electronic devices has increased considerably. For mobile electronic devices, battery power may be conserved using a low power hibernation mode.

BRIEF DESCRIPTION OF DRAWINGS

For a more complete understanding of the present disclosure, reference is now made to the following description taken in conjunction with the accompanying drawings.

FIGS. 1A-1B illustrate overviews of systems for implementing embodiments of the present disclosure.

FIGS. 2A-2B illustrate a block diagram and a flowchart conceptually illustrating a method for placing a device in a suspended state.

FIGS. 7A-7B are charts illustrating example transfer rates associating with loading snapshot data from a hibernation state according to embodiments of the present disclosure.

FIGS. 10A-10D illustrate examples of extending a length of time before failure by using thresholds according to embodiments of the present disclosure.

DETAILED DESCRIPTION

Figure 2A:
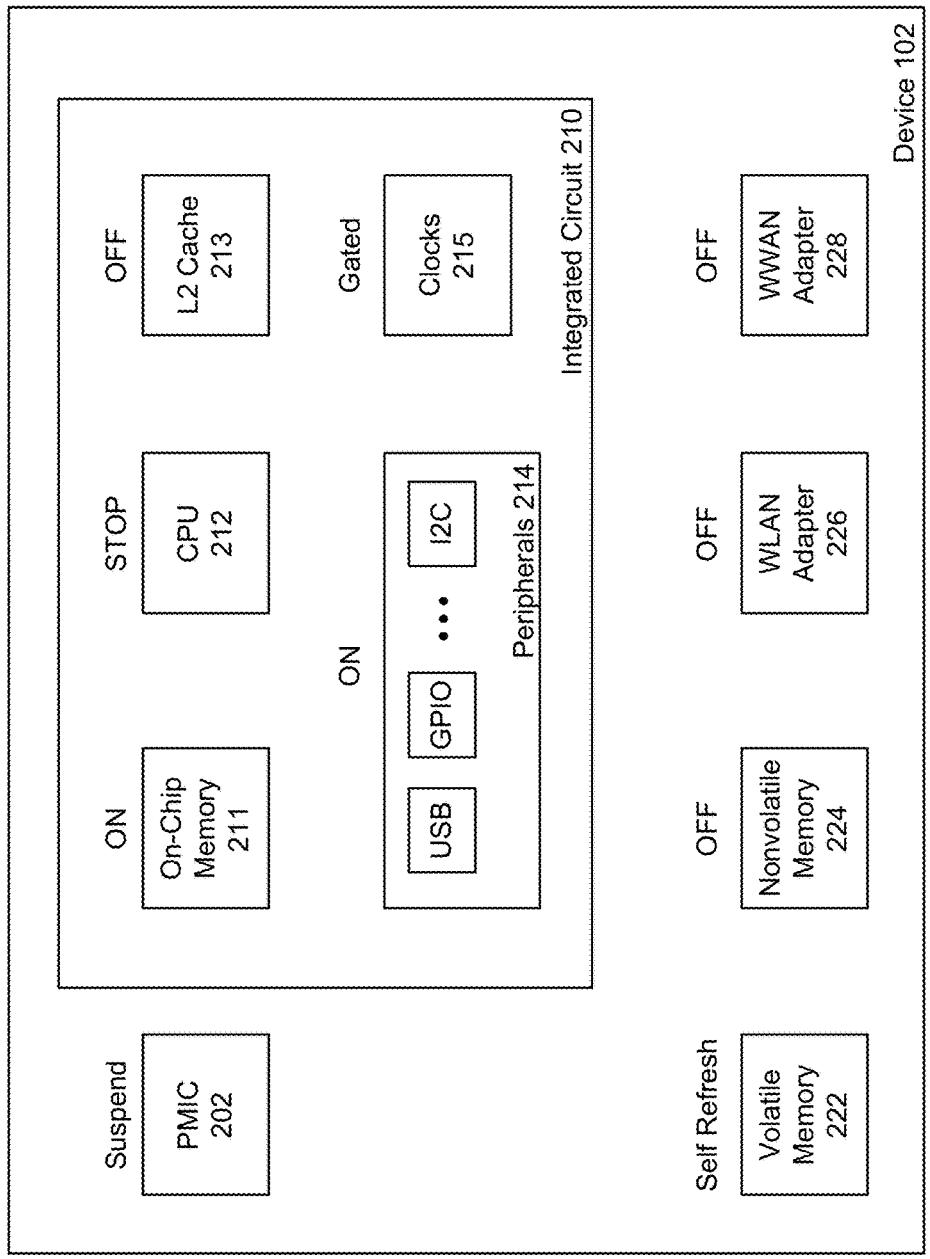

Electronic devices, such as electronic readers, commonly include a battery. To reduce power consumption and therefore increase a length of battery life, a device may enter a low power consumption state when the device idle. A first example of a low power consumption state is a suspended state, which reduces the power consumption a small amount but may resume normal operation relatively quickly as power is maintained to volatile memory (e.g., random-access memory (RAM) such as double data rate synchronous dynamic random-access memory (DDR SDRAM)) and therefore data stored in the volatile memory is refreshed. A second example of a low power consumption state is a hibernation state, which reduces the power consumption a large amount but may resume normal operation relatively slowly as power is not maintained to the volatile memory and therefore data stored in the volatile memory (e.g., snapshot data) must be loaded from nonvolatile memory (e.g., hard drive, solid state drive or the like such as an embedded multimedia card (eMMC)).

The time from receiving a restore command to system interactivity (e.g., device responding to user input) may be reduced by preloading a portion of the snapshot data from the nonvolatile memory to the volatile memory, resuming system interactivity and then loading the remaining snapshot data during idle periods. However, while the time to system interactivity is reduced, a user may perceive lag when snapshot data isn't loaded in the volatile memory and must be loaded from the nonvolatile memory. In addition, a sequential read/write speed associated with the preloading of the nonvolatile memory may be much faster than a random access read/write speed associated with loading the data on-demand.

To reduce power consumption while reducing a latency perceived by a user, devices, systems and methods are disclosed for determining data to include in snapshot data and preloading a portion of the snapshot data upon resuming from a hibernation state. By preloading snapshot data that is likely to be requested by the user, the device may reduce the perceived latency as the requested data is already loaded in the volatile memory.

FIG. 1A illustrates an overview of a system 100 for implementing embodiments of the present disclosure. The system 100 includes a device 102, such as a smart phone, an electronic reader or the like, having a display 104. The display 104 may be an electrophoretic display, an electrowetting display and/or other low-power, high-latency displays known to one of skill in the art. However, the present disclosure is not limited thereto and the device 102 may be any electronic device including a processor and a battery.

To reduce power consumption and therefore increase a battery life of the device 102, the device 102 may disable components and enter a low power consumption state. When the device 102 disables a component or disables power to the component, the device 102 is turning off, powering off or otherwise disabling the component so that the component does not consume power. While the component is disabled, the component is unable to perform normal operation and certain features of the device 102 are therefore unavailable. Thus, the device 102 may disable components to reduce the power consumption during periods of inactivity. Examples of a low power consumption state include a suspended state and/or a hibernation state. The suspended state has lower power consumption than normal system operation but maintains power to certain components and maintains data stored in volatile memory, allowing the device 102 to resume normal system operation (e.g., system interactivity) after a short period of time. In contrast, the hibernation state has even lower power consumption than the suspended state but resuming normal system operation (e.g., system interactivity) requires a slightly longer period of time. For example, the hibernation state reduces power consumption by copying a snapshot of data stored in the volatile memory into nonvolatile memory and disabling additional components, such as the volatile memory. In order to resume normal system operation, the device 102 must copy the snapshot from the nonvolatile memory back to the volatile memory prior to system interactivity (e.g., responsiveness to input from a user) corresponding to an active state. A period of time between exiting the hibernation state and entering the active state may be referred to as an "unresponsive state." In the unresponsive state, the device 102 may display content on the display 104 and otherwise appear interactive, but the snapshot is being copied to the volatile memory and the device 102 is unresponsive to user input.

As illustrated in FIG. 1A, the device 102 may receive (120) a hibernation command instructing the device 102 to enter the hibernation state. In response to receiving the hibernation command, the device 102 may determine (122) a list of processes to be preloaded after hibernation, determine (124) preload data, store (126) the list and the preload data in a snapshot in nonvolatile memory and store (128) additional data in the snapshot. For example, as will be discussed in greater detail below, the device 102 may identify processes running (e.g., executing) on the device 102, may determine first data associated with the running processes and may select a first portion of the first data as the preload data and a second portion of the first data as the additional data. After storing the snapshot, the device 102 may enter (130) the hibernation state and reduce the power consumption of the device 102 by removing power to components in the device 102.

The device 102 may receive (132) a command to exit the hibernation state and resume normal system operation. For example, the command may be a wake-up event, a physical press of a power button or the like that triggers the device 102 to exit the hibernation state. To resume system operation, the device 102 may load (134) the preload data during preloading, may activate (136) user space processes and may resume (138) system operation. After resuming the system operation, the device 102 may be responsive to user input.

After resuming system operation, the device 102 may load (140) data from the snapshot during on-demand loading. For example, the user may input a command associated with a first process and the device 102 may load data associated with the first process from the snapshot. The device 102 may load (142) remaining data from the snapshot when the system is idle. For example, the device 102 may determine that the device 102 is idle and may load the remaining data until the system is no longer idle.

To improve battery life of the device 102 and reduce overall power consumption, the device 102 may enter the hibernation state when the device is idle. However, each time the device 102 enters the hibernation state the device 102 may store data from volatile memory to a snapshot in nonvolatile memory, such as solid state storage like embedded multimedia card (eMMC), that has a finite lifetime expectancy. For example, the nonvolatile memory may write to an individual sector a fixed number of times (e.g., 2,000 times) before receiving read/write errors associated with the sector, although each individual sector is different. To prolong a useful life of the nonvolatile memory, the nonvolatile memory may include a controller that performs wear leveling to evenly distribute read/write commands throughout the sectors. However, after entering the hibernation state a number of times, an amount of sectors receiving read/write errors rises above a threshold and the nonvolatile memory reaches its finite lifetime expectancy.

In order to prolong the useful life of the nonvolatile memory, and therefore reduce power consumption of the device 102 by enabling the device 102 to enter the hibernation state over a longer period of time, the device 102 may limit a frequency that the device 102 enters the hibernation state. For example, after a first number of "cumulative hibernations" (e.g., the device 102 enters the hibernation state a first number of times over a total lifetime of the device 102), the device 102 may limit the device to a fixed number of "session hibernations" (e.g., the device 102 enters the hibernation state a maximum of the fixed number of times over a period of time).

As illustrated in FIG. 1B, the device 102 may determine (150) cumulative threshold(s) and determine (152) session threshold(s) that correspond to the cumulative threshold(s). The device 102 may receive (154) a hibernation command, determine (156) a first value of cumulative hibernations (e.g., total number of times that the device 102 entered the hibernation state over the total lifetime of the device 102) and may determine (158) a session threshold corresponding to the first value. For example, the device 102 may compare the first value to one or more cumulative thresholds and may determine a corresponding session threshold (e.g., maximum number of times that the device 102 may enter the hibernation state for each session or interval). The device 102 may determine (160) a second value of session hibernations, may determine (162) that the second value is below the session threshold and may enter (164) the hibernation state.

The device 102 may compare the total number of hibernations to any number of cumulative thresholds. In some examples, the device 102 may include a cumulative counter that increments each time the device 102 enters the hibernation state, such that an output of the cumulative counter corresponds to the cumulative number of hibernations. Similarly, the device 102 may include a session counter that increments each time the device 102 enters the hibernation state and resets to zero at the end of the session, such that an output of the session counter corresponds to the number of hibernations per session.

The session threshold may correspond to fixed intervals of time (e.g., hourly, daily, weekly, etc.) and/or to variable intervals of time (e.g., each time the device 102 is on battery power, resetting when the device 102 is being charged or each time the device 102 is powered on, resetting when the device 102 is powered off). Thus, a number of times that the device 102 enters the hibernation state may vary over time and the device 102 may determine an interval associated with the session based on usage of the device 102. For example, if the device 102 is charged once a week or less, the device 102 may associate the session threshold with a weekly interval, thus limiting the device 102 to hibernating a maximum number of times per week to reduce power consumption and prolong the battery life. In contrast, if the device 102 is charged twice a week or more, the device 102 may base the session threshold on the frequency of charging, thus limiting the device 102 to hibernating a maximum number of times each time that the device 102 runs on battery power. This may avoid a situation where a battery of the device 102 lasts a first duration early in the week (when the device 102 enters the hibernation state) and a second duration later in the week (when the device 102 has exceeded the session threshold and enters the suspended state instead, consuming more power).

To illustrate an example, the device 102 may determine a first cumulative threshold (e.g., 50% of lifetime expectancy) associated with a first session threshold (e.g., entering the hibernation state a maximum of 10 times per day) and a second cumulative threshold (e.g., 75% of lifetime expectancy) associated with a second session threshold (e.g., entering the hibernation state a maximum of 5 times per day). Thus, the device 102 may enter the hibernation state an unlimited amount of times per day until the total number of hibernations is above the first cumulative threshold (e.g., total number of hibernations >50% of lifetime expectancy), at which point the device 102 may enter the hibernation state up to the first session threshold (e.g., a maximum of 10 hibernations per day). Once the device 102 reaches the first session threshold (e.g., 10 hibernations in one day), the device 102 may enter a suspended state instead of the hibernation state until an expiration of the session (e.g., until the next day). After the total number of hibernations is above the second cumulative threshold (e.g., total number of hibernations >75% of lifetime expectancy), the device 102 may enter the hibernation state up to the second session threshold (e.g., a maximum of 5 hibernations per day). Once the device 102 reaches the second session threshold (e.g., 5 hibernations in one day), the device 102 may enter the suspended state instead of the hibernation state until an expiration of the session (e.g., until the next day).

As discussed above, the device 102 may reduce power consumption by disabling components and entering a suspended state and/or a hibernation state. The suspended state has lower power consumption than normal system operation but maintains power to certain components and maintains data stored in volatile memory, allowing the device 102 to resume normal system operation (e.g., system interactivity) after a short period of time. In contrast, the hibernation state has even lower power consumption than the suspended state but resuming normal system operation (e.g., system interactivity) requires a slightly longer period of time. For example, the hibernation state reduces power consumption by copying a snapshot of data stored in the volatile memory into nonvolatile memory and disabling additional components, such as the volatile memory. In order to resume normal system operation, the device 102 must copy the snapshot from the nonvolatile memory back to the volatile memory prior to system interactivity (e.g., responsiveness to input from a user).

FIG. 2A illustrates a block diagram of the device in a suspended state 200. As illustrated in FIG. 2A, the device 102 may include a Power Management Integrated Circuit (PMIC) 202, an integrated circuit (IC) 210, volatile memory 222 (e.g., random-access memory (RAM) such as double data rate synchronous dynamic random-access memory (DDR SDRAM)), nonvolatile memory 224 (e.g., hard drive, solid state drive or the like such as an embedded multimedia card (eMMC)), wireless local area network (WLAN) adapter 226 and wireless wide area network (WWAN) adapted 228. The IC 210 may include on-chip memory 211 (e.g., RAM), a central processing unit 212, L2 cache 213, peripherals 214 (e.g., Universal Serial Bus (USB), general purpose input/output (GPIO), Inter-Integrated Circuit (I2C), electrophoretic display controller (EPDC), secure digital high capacity (SDHC), ultra SDHC (uSDHC) or the like) and clocks 215.

The PMIC 202 may be configured to manage power requirements of the device 102 and may be used to place the device in the suspended state 200. For example, when the PMIC 202 is in suspend mode, the device 102 may stop the CPU 212 (e.g., place the CPU 212 into a low power consumption mode), gate the clocks 215, place the volatile memory 222 in a low power consumption mode and disable power to the L2 cache 213, nonvolatile memory 224, WLAN adapter 226 and/or WWAN adapter 228. However, the PMIC 202 may maintain power to the on-chip memory 211 and the peripherals 214. Thus, the PMIC 202 may maintain power to multiple rails without providing a lot of current, reducing power consumption of the device 102.

In the low power consumption mode, the volatile memory 222 is inaccessible to the device 102, such that the device 102 cannot access data stored in the volatile memory 222, but the volatile memory 222 self-refreshes the data using an internal timer so that the data stored in the volatile memory 222 is maintained. When the clocks 215 are gated, a majority of the clocks are maintained at a fixed level without high frequency oscillations, resulting in a low power consumption. As the clocks 215 are gated, the peripherals 214 are not operating but register settings are preserved because the PMIC 202 maintains power to the peripherals 214. When the WLAN adapter 226 and the WAN adapter 228 are disabled, the device 102 is not connected to an access point, cellular network tower or any other network. While the nonvolatile memory 224 is disabled, data stored in the nonvolatile memory 224 is maintained until the device 102 resumes system interactivity following a restore command (or other event trigger associated with a wake-up event). Upon receiving the restore command, the device 102 may be unresponsive to a user until the components are enabled and functioning.

FIG. 2B is a flowchart conceptually illustrating a method for entering the suspended state 200. As illustrated in FIG. 2B, the device 102 may receive (250) a command to enter a suspended state, may gate (252) clocks (e.g., maintain constant values without high speed oscillation), place (254) volatile memory in self-refresh mode, remove (256) power to nonvolatile memory, remove (258) power to a WLAN adapter, remove (260) power to a WWAN adapter, remove (262) power to a L2 cache, place (264) the CPU in low power mode, maintain (266) power to certain rails such as peripherals and on-chip memory and place (268) the PMIC in a suspended state. Upon receiving a restore command, the device 102 may perform the inverse of the steps illustrated in FIG. 2B to resume system interactivity and normal operation.

Figure 3A:
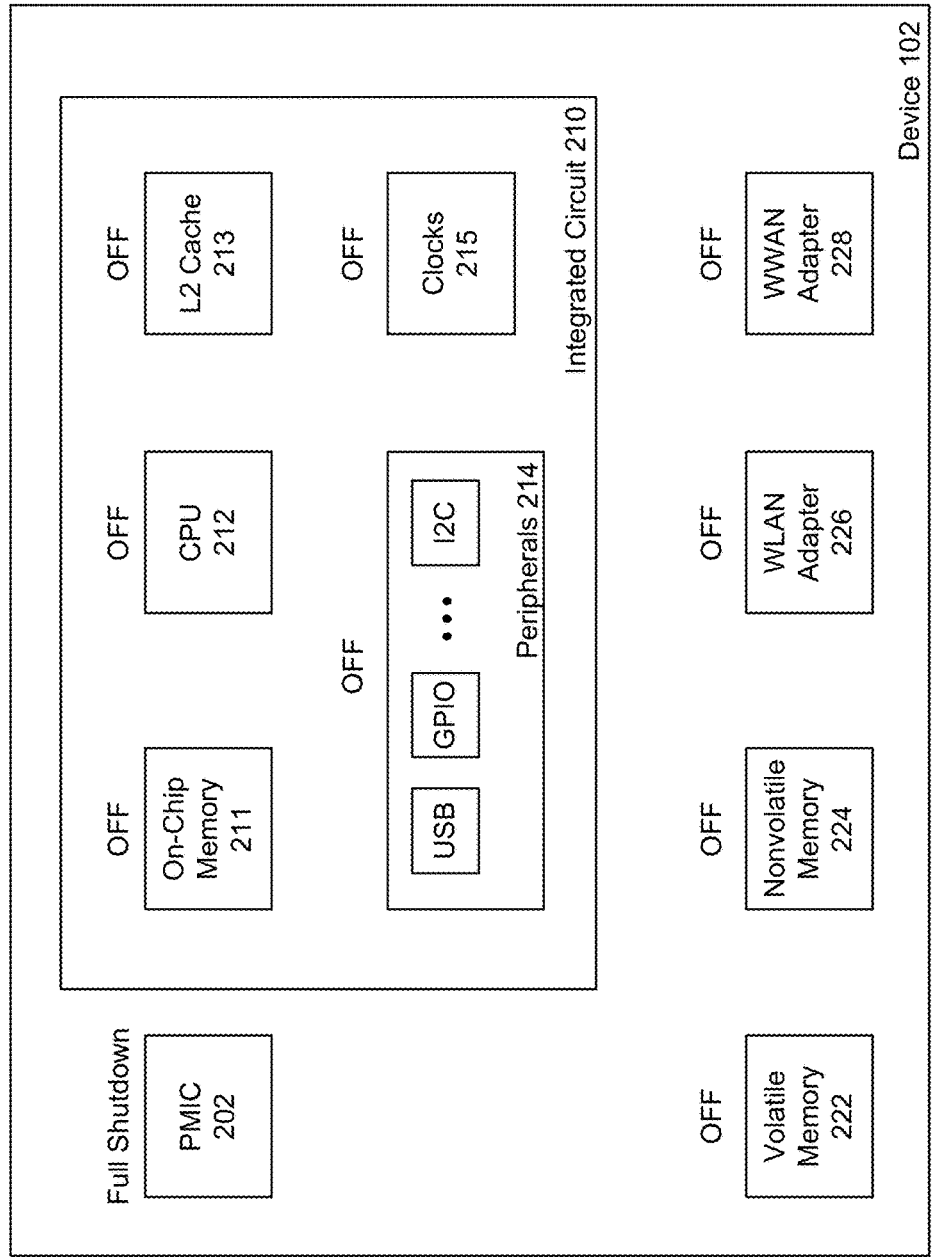
FIGS. 3A-3C illustrate a block diagram and a flowchart conceptually illustrating an example method for placing a device in a hibernation state.
Figure 3B:
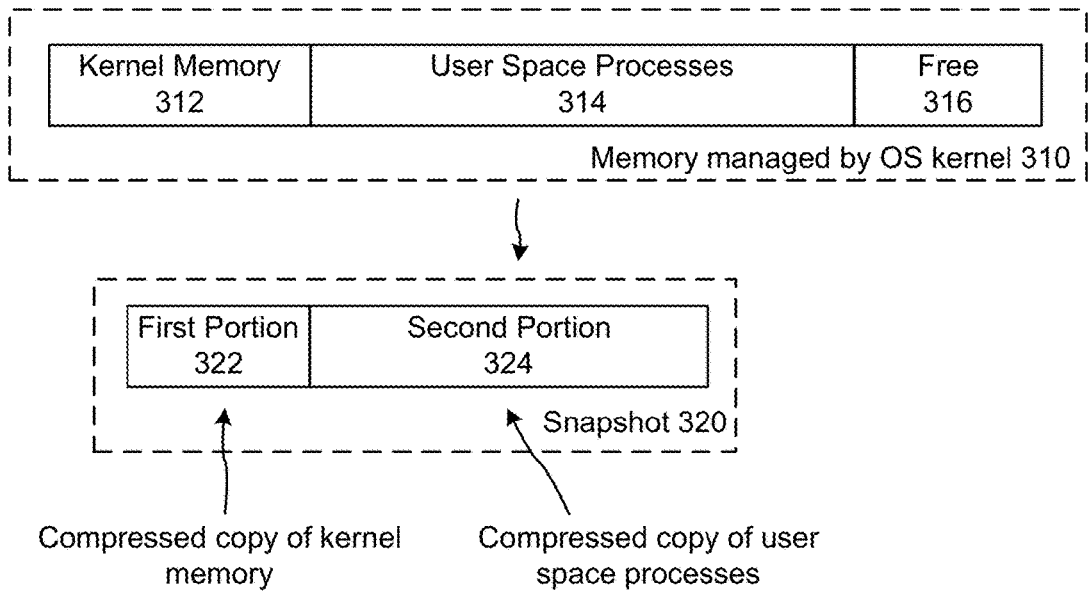
Figure 3C:
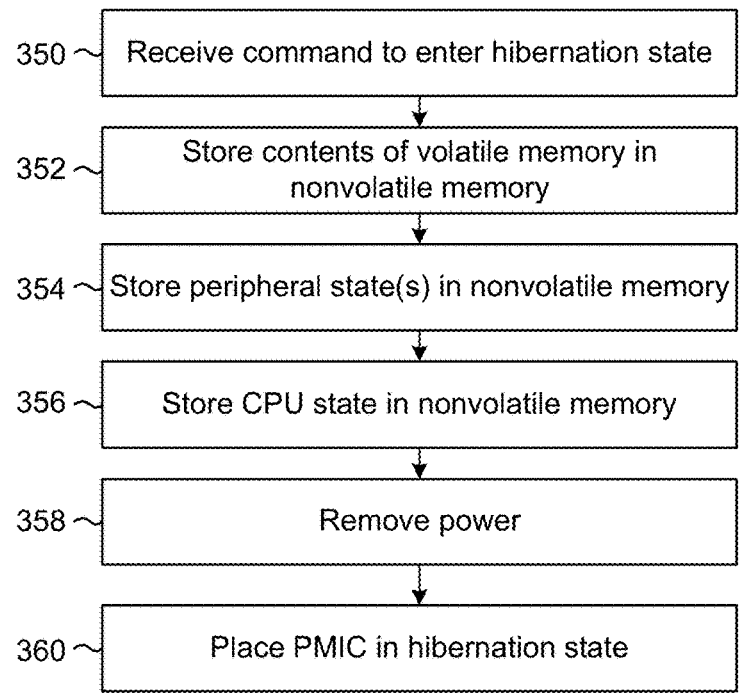

As discussed above, the suspended state may reduce power consumption to a first value (e.g., 650 mA) and may resume system interactivity after a first period of time (e.g., 2 seconds). In contrast, a hibernation state may reduce power consumption to a second value smaller than the first value (e.g., 100 mA) and resume system interactivity after a second period of time longer than the first period of time (e.g., 6 seconds). FIGS. 3A-3C illustrate a block diagram and a flowchart conceptually illustrating an example method for placing a device in a hibernation state.

As illustrated in FIG. 3A, the PMIC 202 may be configured to manage power requirements of the device 102 and may be used to place the device in a hibernation state 300. For example, when the PMIC 202 is in full shutdown mode, the device 102 may disable power to the on-chip memory 211, the CPU 212, the L2 cache 213, the peripherals 214, the clocks 215, the volatile memory 222, the nonvolatile memory 224, the WLAN adapter 226 and the WWAN adapter 228.

When the nonvolatile memory 224 is disabled, data stored in the nonvolatile memory 224 is maintained. However, when the volatile memory 222 is disabled, data stored in the volatile memory 222 is not maintained. Similarly, data stored in the on-chip memory 211, register settings stored in the peripherals 214 and/or other data is not maintained during the hibernation state 300. Therefore, the device 102 must copy data from the volatile memory 222, the on-chip memory 211, the peripherals 214 and/or other components to the nonvolatile memory 224 prior to entering the hibernation state. Thus, the nonvolatile memory 224 may store a snapshot or snapshot data that enables the device 102 to restore data to the volatile memory 222, data to the on-chip memory 211, register settings to the peripherals 214 and/or other data or settings prior to resuming system interactivity. Upon receiving a restore command (or other event trigger associated with a wake-up event), the device 102 may be unresponsive to a user until the components are enabled and the snapshot data is loaded into the on-chip memory 211, peripherals 214, volatile memory 222 and/or other components.

FIG. 3B illustrates an example of memory managed by an operating system (OS) kernel 310 being stored in a snapshot 320. As illustrated in FIG. 3B, the memory managed by the OS kernel 310 may include kernel memory 312 (e.g., memory associated with the OS), user space processes 314 (e.g., memory associated with processes running on the device 102) and free memory 316 (e.g., memory currently available). The snapshot 320 may include a first portion 322, which corresponds to a compressed copy of the kernel memory 312, and a second portion 324, which corresponds to a compressed copy of the user space processes 314, thus ignoring the free memory 316.

To generate the snapshot 320, the device 102 may store data stored in the user space processes 314 portion of the memory to the second portion 324 in the snapshot 320. The device 102 may then generate an atomic copy of data stored in the kernel memory 312 by freezing contents of volatile memory, freezing a user state and/or freezing state(s) of the input/output system corresponding to each process running on the device 102. As used herein, freezing contents refers to capturing the contents at a fixed time, such as when the hibernation command is received or after storing the second portion 324 to the snapshot 320. In some examples, the frozen data may be copied to generate an atomic copy that will not change. For example, data stored in the kernel memory 312 may be copied to the user space processes 314 and/or the free memory 316 portions of the memory managed by the OS kernel 310. If the data stored in the kernel memory 312 is not copied to the user space processes 314 and/or the free memory 316, the data may be changed or modified when generating the snapshot 320, such that the first portion 322 does not correspond to the data stored in the kernel memory 312 at the fixed time. For example, copying data stored in the kernel memory 312 without first saving an atomic copy may change values, counter values, which sector saved, etc. associated with a state of the device. To generate the atomic copy, once data stored in the user space processes 314 is stored as the second portion 324 of the snapshot 320, the device 102 may copy the data stored in the kernel memory 312 to the user space processes 314 and/or free memory 316 using program code that performs memory to memory copying without changing a state of the memory itself.

After generating the atomic copy, the device 102 may store the second portion 324 in the snapshot 320 and then may store the first portion 322 in the snapshot 320. The device 102 may generate the atomic copy and store the snapshot 320 in this particular order so that when the first portion 322 is restored to the kernel memory 312, the data stored in the kernel memory 312 may correspond to the data stored in the user space processes 314 at the fixed time.

FIG. 3C is a flowchart conceptually illustrating a method for entering the hibernation state 300. As illustrated in FIG. 3C, the device 102 may receive (350) a command to enter a hibernation state, may store (352) contents of volatile memory in nonvolatile memory (e.g., generate the first portion and the second portion of the snapshot), store (354) peripheral state(s) in the nonvolatile memory, store (356) a CPU state in the nonvolatile memory, remove (358) power to the components of the device 102 (excluding the PMI 202) and place the PMIC in a hibernation state. Upon receiving a restore command (or other event trigger associated with a wake-up event), the device 102 may perform the inverse of the steps illustrated in FIG. 3C to resume system interactivity and normal operation. As discussed above, the hibernation state may offer power savings over a traditional suspended state. However, due to the additional time required to restore the snapshot to the volatile memory and other components, the hibernation state requires more time to fully activate when receiving a restore command.

Figure 4A:
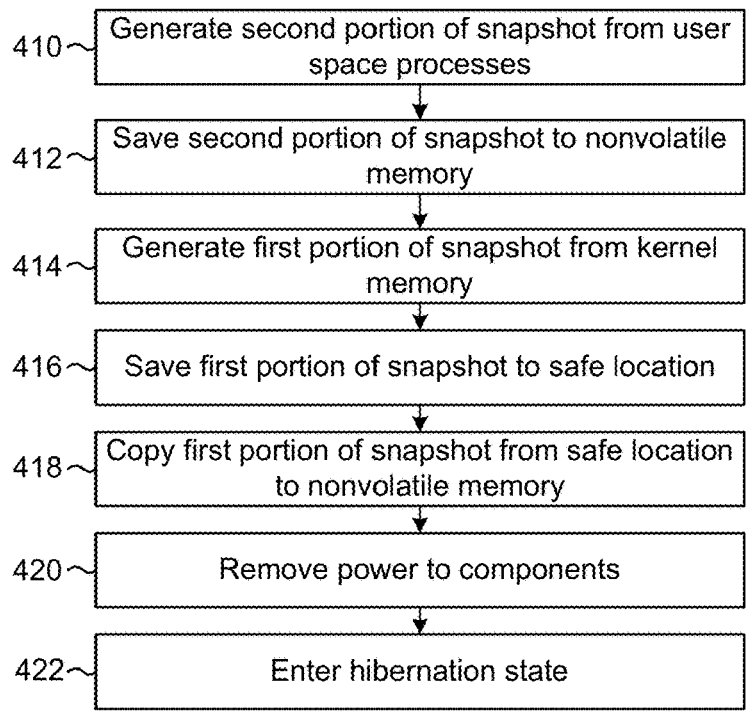
FIGS. 4A-4C are flowcharts conceptually illustrating methods for entering and exiting a hibernation state.
Figure 4B:
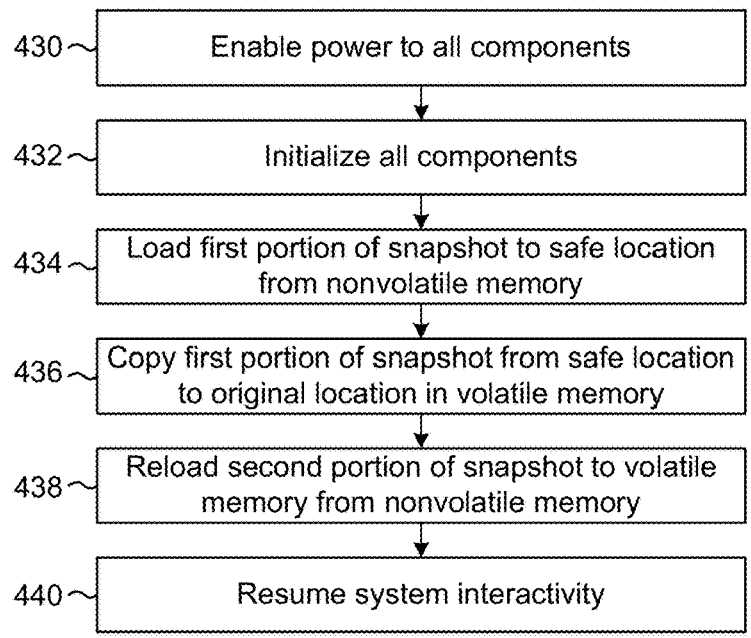
Figure 4C:
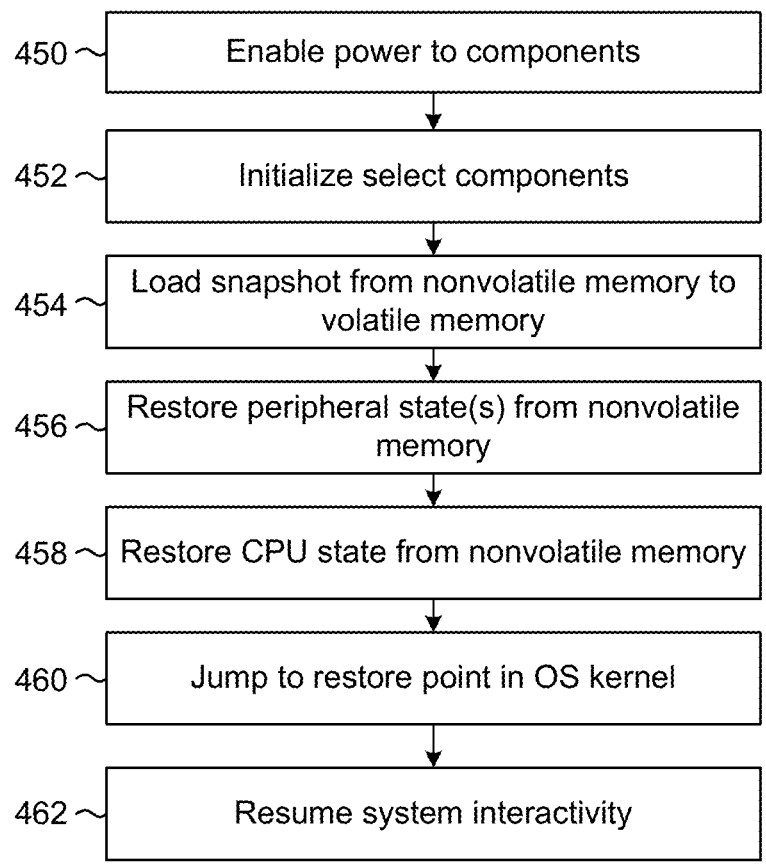

FIGS. 4A-4C are flowcharts conceptually illustrating methods for entering and exiting a hibernation state. As illustrated in FIG. 4A, the device 102 may generate (410) a second portion of a snapshot from user space processes and may save (412) the second portion of the snapshot to nonvolatile memory, as described above with regard to FIG. 3B. For example, the device 102 may generate compressed data corresponding to data associated with the user space processes that is stored in the volatile memory and may save the compressed data to the nonvolatile memory. The device 102 may generate (414) a first portion of the snapshot from the kernel memory, may save (416) the first portion of the snapshot to a safe location and may copy (418) the first portion of the snapshot from the safe location to the nonvolatile memory. For example, the device 102 may generate compressed data corresponding to data associated with the kernel memory that is stored in a first location in the volatile memory and may save an atomic copy of the compressed data to a second location in the volatile memory. The device 102 may then copy the atomic copy from the second location in the volatile memory to the nonvolatile memory as the first portion of the snapshot. The device 102 may then remove (420) power to components of the device 102 and enter (422) the hibernation state.

FIG. 4B is a flowchart conceptually illustrating a first method for loading snapshot data from a hibernation state and resuming system interactivity from the hibernation state. As illustrated in FIG. 4B, the device 102 may enable (430) power to all components of the device 102, may initialize (432) all of the components of the device, may load (434) a first portion of the snapshot to a safe location from the nonvolatile memory, may copy (436) the first portion of the snapshot from the safe location to its original location in volatile memory, may reload (438) the second portion of the snapshot to the volatile memory from the nonvolatile memory and may resume (440) system interactivity (e.g., responsiveness to user input). Using the first method illustrated in FIG. 4B, the device 102 may completely reload snapshot data to the volatile memory prior to resuming system interactivity. While the first method allows the device 102, after resuming system interactivity, to respond to user commands without any perceived latency due to loading the snapshot data, a latency from receiving the restore command to resuming system interactivity is relatively long.

In contrast to the first method, the device 102 may initialize select components and load the snapshot data directly to the volatile memory from the nonvolatile memory, reducing the latency from receiving the restore command to resuming system interactivity. FIG. 4C is a flowchart conceptually illustrating a second method for loading snapshot data from a hibernation state and resuming system interactivity from the hibernation state. As illustrated in FIG. 4C, the device 102 may enable (450) power to components, may initialize (452) the select components, may load (454) snapshot data from nonvolatile memory directly to the volatile memory, may restore (456) peripheral state(s) from the nonvolatile memory, may restore (458) the CPU state from the nonvolatile memory, may jump (460) to a restore point in the OS kernel and may resume (462) the system interactivity. For example, after jumping to the restore point in the OS kernel the device 102 may enable power to remaining components and initialize the remaining components prior to resuming the system interactivity.

Figure 5:
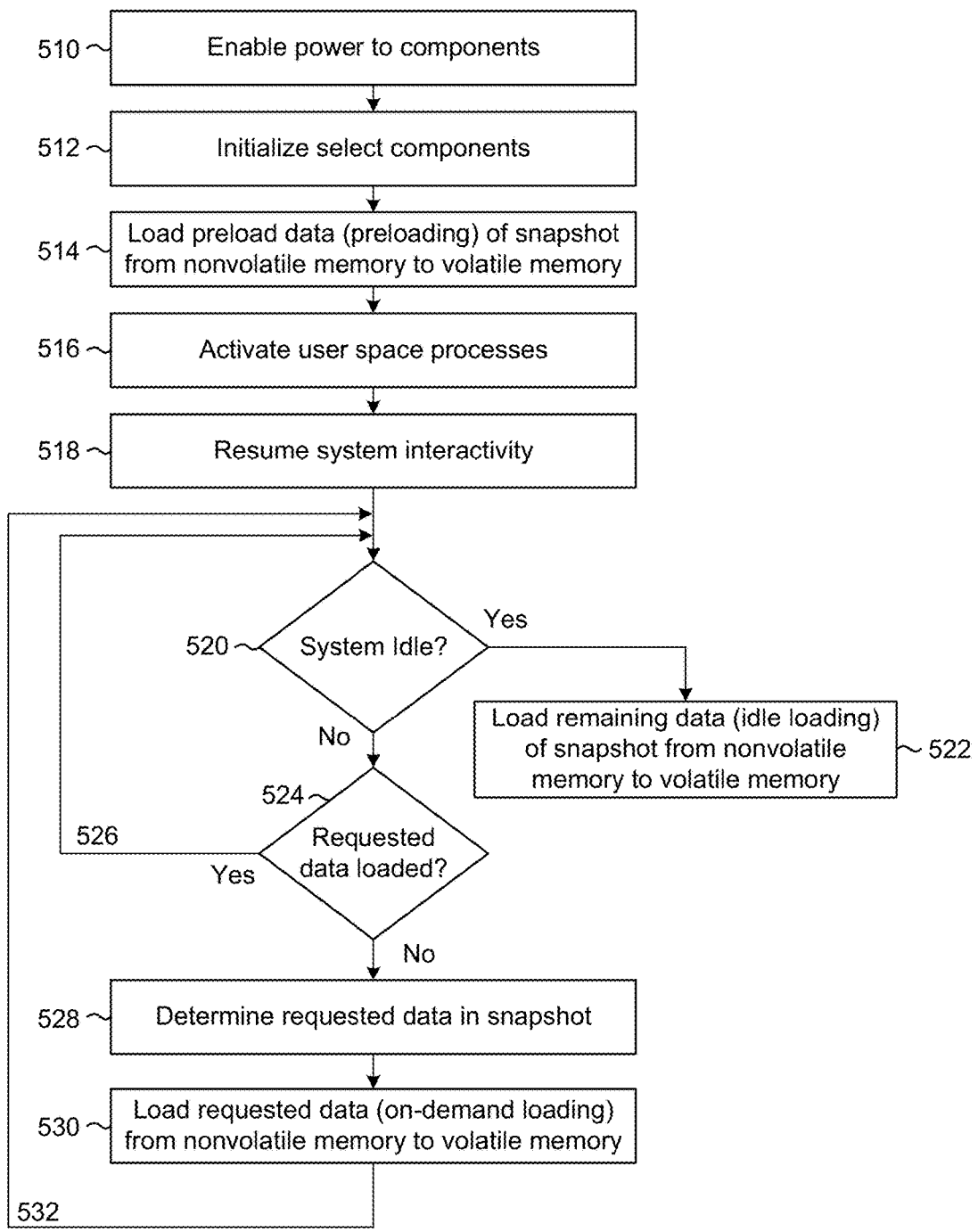
FIG. 5 is a flowchart conceptually illustrating an example method for loading snapshot data from a hibernation state according to embodiments of the present disclosure.

To further reduce the latency from receiving the restore command to resuming system interactivity, the device 102 may load a portion of the snapshot data prior to resuming system interactivity and may continue loading the snapshot data after resuming system interactivity. FIG. 5 is a flowchart conceptually illustrating an example method for loading snapshot data from a hibernation state according to embodiments of the present disclosure.

As illustrated in FIG. 5, the device 102 may enable (510) power to components, may initialize (512) select components, load (514) preload data of snapshot from nonvolatile memory to volatile memory (e.g., preloading), may activate (516) user space processes and may resume (518) system interactivity. For example, the preload data may include a portion of the snapshot data that is required to resume system interactivity, while remaining portions of the snapshot data may be loaded at a later point in time. Normal device operation (e.g., system interactivity) may be referred to as an "active state." A period of time between exiting the hibernation state and entering the active state may be referred to as an "unresponsive state." In the unresponsive state, the device 102 may display content on the display 104 and otherwise appear interactive, but the snapshot is being copied to the volatile memory and the device 102 is unresponsive to user input.

To load the remaining portions of the snapshot data, the device 102 may determine (520) whether the system is idle. If the device 102 determines that the system is idle, the device 102 may load (522) remaining data of the snapshot from the nonvolatile memory to the volatile memory (e.g., idle loading).

If the system is busy and therefore not idle, the device 102 may perform processes requested by a user and determine (524) if requested data is loaded in the volatile memory. If the requested data is loaded, the device 102 may loop (526) to step 520 and continue. However, if the requested data is not loaded from the snapshot, the device 102 may determine (528) the requested data in the snapshot, may load (530) the requested data from the nonvolatile memory to the volatile memory (e.g., on-demand loading) and may loop (532) to step 520. For example, if the user inputs a command associated with a process (e.g., application) that was running prior to the hibernation state, data associated with the process may be stored in the remaining portion of the snapshot that was not loaded to the volatile memory. In order to perform the command, the device 102 may load the requested data from the snapshot to the volatile memory (e.g., on-demand loading), which may result in a slight latency perceived by the user. For example, after receiving the command, the device 102 may not perform the command and display the requested data until the device 102 loads the requested data from the nonvolatile memory to the volatile memory.

Figure 6:
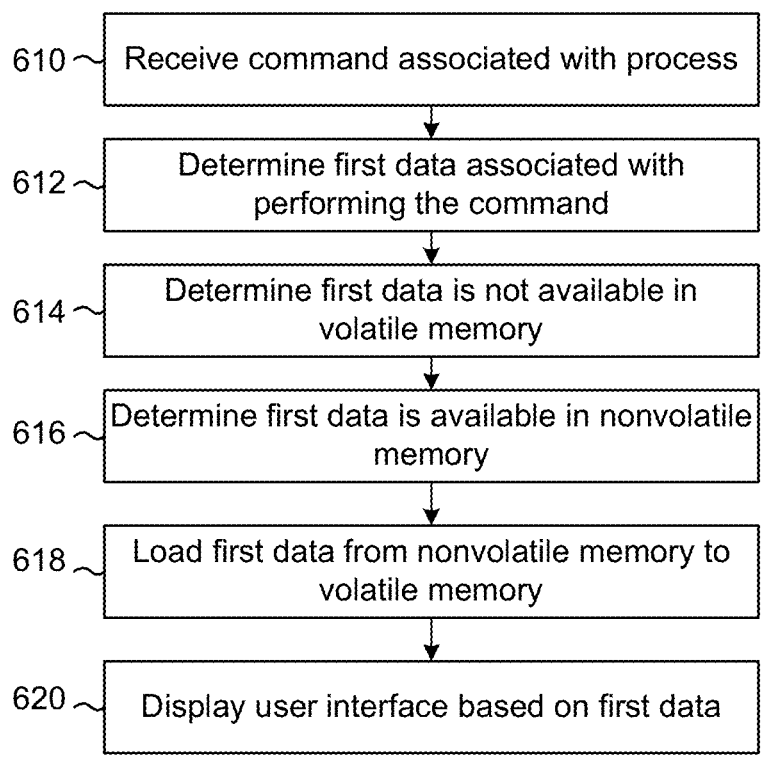
FIG. 6 is a flowchart conceptually illustrating an example method for accessing data on demand according to embodiments of the present disclosure.

When a process requests data from the snapshot that is not preloaded, the device 102 may perform an additional step of arbitration to identify the requested data in the snapshot and perform on-demand loading to load the requested data from the snapshot. FIG. 6 is a flowchart conceptually illustrating an example method for accessing data on demand according to embodiments of the present disclosure. As illustrated in FIG. 6, the device 102 may receive (610) a command associated with a process and may determine (612) first data associated with performing the command. If the first data wasn't preloaded, the device 102 may determine (614) that the first data is not available in volatile memory, may determine (616) that the first data is available in nonvolatile memory, may load (618) the first data from the nonvolatile memory to the volatile memory and may display (620) a user interface based on the first data.

If the device 102 selects a small portion of the snapshot data as preload data (e.g., data loaded during preloading in step 514), the device 102 may resume system interactivity relatively fast and may load the remaining data during idle loading without any latency perceived by the user. However, during preloading, the device 102 may load a relatively high number of sectors at a time (e.g., 100 to 125 sectors) as read access is much faster than on-demand access due to limitations caused by a controller of the nonvolatile memory. In contrast, the device 102 may load a relatively small number of sectors at a time (e.g., 4 to 8 sectors) during on-demand loading. Thus, while the device 102 may resume system interactivity relatively fast, if the user requests data that isn't preloaded, the on-demand loading may load the data at a much slower transfer rate and result in additional latency perceived by the user.

To reduce the latency perceived by the user, the device 102 may predict processes and corresponding data that are likely to be requested by the user after resuming from the hibernation state and may add the corresponding data to the preload data. For example, the device 102 may identify processes running when the hibernation command is received and may associate data corresponding to the running processes with preload data to be loaded during preloading. As a result, the data corresponding to the running processes will be loaded prior to resuming system interactivity in step 518. Thus, while increasing an amount of preload data may result in a slight increase in time before the device 102 resumes system interactivity, the user is less likely to request data that isn't loaded in the volatile memory, reducing a latency caused by loading the requested data using on-demand loading.

Figure 7A:
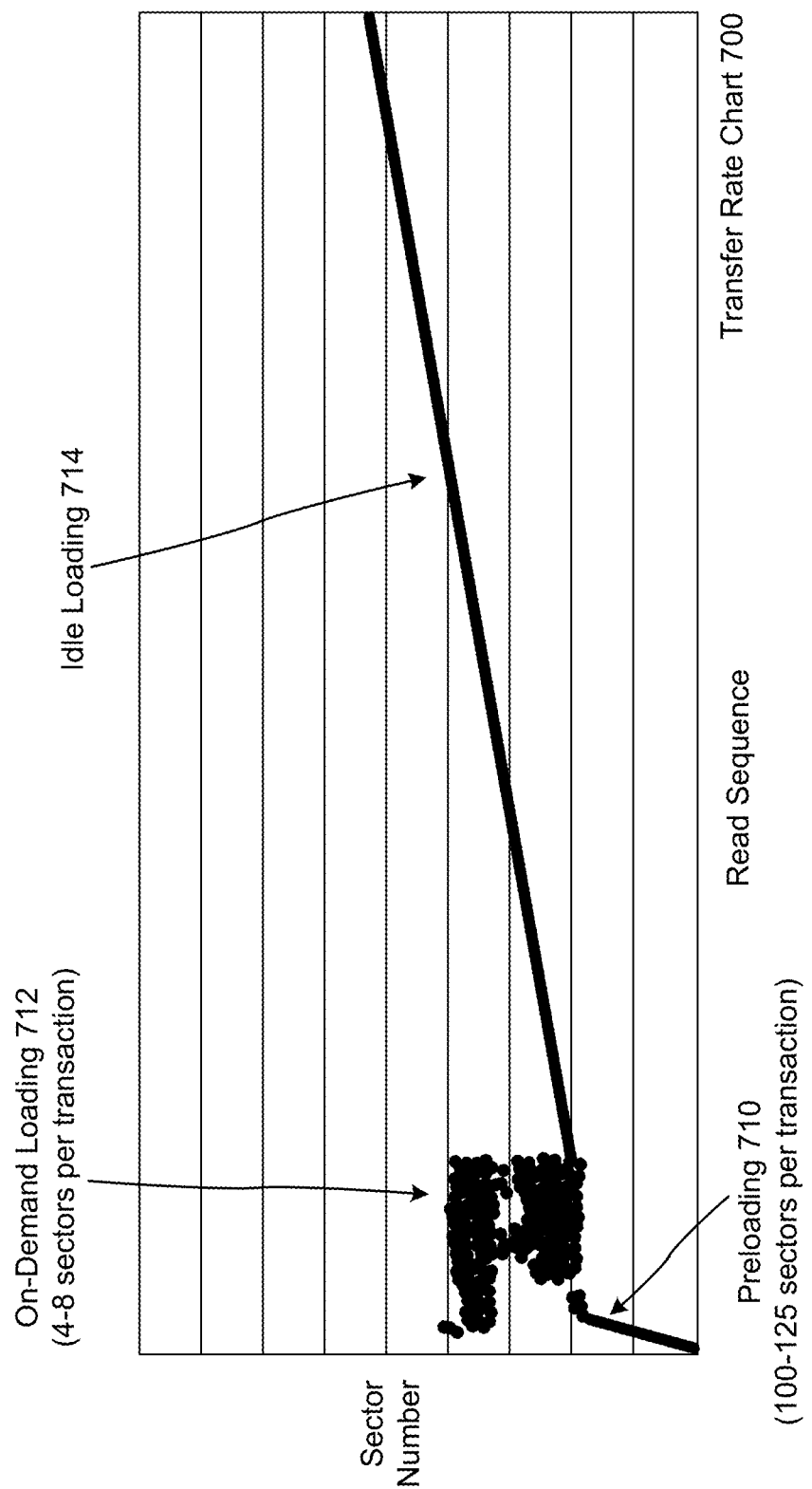

FIGS. 7A-7B are charts illustrating example transfer rates associating with loading snapshot data from a hibernation state according to embodiments of the present disclosure. FIG. 7A illustrates a first transfer rate chart 700 that corresponds to a minimal amount of preload data. As illustrated in FIG. 7A, preloading 710 (with a transfer rate of 100-125 sectors per transaction) accesses a large number of sectors sequentially, allowing the device to resume system interactivity after a first period of time (e.g., <6 seconds). However, when the user requests data that isn't preloaded from the snapshot, on-demand loading 712 (with a transfer rate of 4-8 sectors per transaction) accesses a small number of sectors over a period of time, resulting in a latency perceived by the user. When the device 102 is idle, idle loading 714 may load the remaining sectors.

In contrast, FIG. 7B illustrates a second transfer rate chart 750 that corresponds to additional data being associated with preload data and loaded during preloading. As illustrated in FIG. 7B, preloading 760 (with a transfer rate of 100-125 sectors per transaction) accesses a large number of sectors sequentially, allowing the device to resume system interactivity after a second period of time (e.g., 6 seconds). As a majority of the snapshot data is preloaded, a majority of data requested by the user after resuming system interactivity is already loaded into the volatile memory. Thus, FIG. 7B illustrates on-demand loading 762 occurring for a small amount of data requested by the user that isn't preloaded from the snapshot, resulting in a reduced latency perceived by the user. When the device 102 is idle, idle loading 764 may load the remaining sectors.

Figure 8:
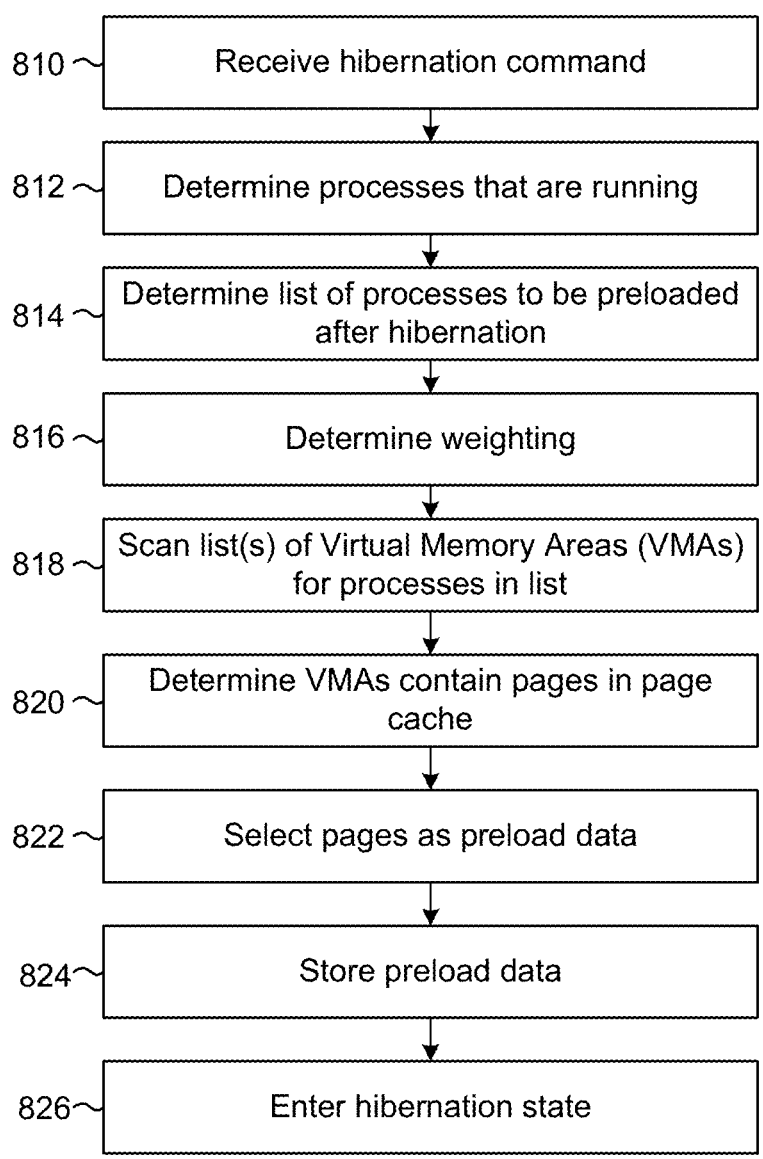
FIG. 8 is a flowchart conceptually illustrating an example method for determining preload data according to embodiments of the present disclosure.

FIG. 8 is a flowchart conceptually illustrating an example method for determining preload data according to embodiments of the present disclosure. As illustrated in FIG. 8, the device 102 may receive (810) a hibernation command, may determine (812) processes that are running, may determine (814) a list of processes to be preloaded after hibernation and may determine (816) a weighting associated with each of the processes in the list. The device 102 may scan (818) list(s) of virtual memory areas (VMAs) for processes included in the list, may determine (820) that VMAs contain memory pages in a page cache and/or volatile memory, may select (822) the memory pages as preload data to be loaded during preloading, store (824) the preload data and enter (826) the hibernation state. While steps 820 and 822 are illustrated as distinct steps, the device 102 may use a single-pass algorithm to perform steps 820 and 822 simultaneously in a single step or "pass," such as scanning the list(s) of VMAs and selecting pages in the page cache as preload data in a single loop.

For ease of use, hereinafter "memory pages" may be referred to as "pages." Virtual memory may refer to a process of storing data in volatile memory and/or nonvolatile memory in order to increase an amount of memory available to an application/process beyond the volatile memory (e.g., physical Random Access Memory (RAM) or the like available on the device 102). An example of a page cache is a cache that associates pages (e.g., fixed-length contiguous block of virtual memory that stores data) stored in volatile memory and/or nonvolatile memory with individual applications/processes.

The page cache is a kernel level concept and may include an entire set of pages, such that anything accessed frequently by the kernel memory 312 is included in the page cache. In contrast, VMAs are a process level concept, such that each process has a corresponding list of VMAs mapping to a set of pages stored in the page cache. For example, a first process may be associated with a first list including twenty VMAs, whereas a second process may be associated with a second list including fifteen VMAs. The overall page cache may be relatively large, while the device 102 may select only a subset of the overall page cache as the preload data (e.g., a third, a quarter or the like). The number of pages from the page cache selected as the preload data varies over time based on a frequency of use. For example, if the kernel memory 310 frequently accesses a first number of pages in the page cache at a first time and a second number of pages in the page cache at a second time, first preload data associated with the first time may include the first number of pages and second preload data associated with the second time may include the second number of pages.

To generate the preload data, the device 102 may scan the list of VMAs for each individual process in order to find the list of pages available and may then determine if the available pages are stored in the page cache. The device 102 may select a first portion of the available pages (that are stored in the page cache) to include in the preload data and may ignore a second portion of the available pages (that are not stored in the page cache). Additionally or alternatively, the device 102 may use multiple techniques to select the first portion to include in the preload data using selection criteria. For example, the device 102 may select entire sets of pages associated with each user space process to include in the preload data, resulting in a large amount of preload data. To reduce the amount of preload data, the device 102 may instead use the selection criteria to select a subset of pages associated with each user space process. For example, the device 102 may select a specific address range associated with each user space process, may select file pages associated with each user space process, may select all active file pages associated with each user space process, may select all file anonymous pages or the like. However, the device 102 may select the subset of pages using techniques known to one of skill in the art without departing from the present disclosure.

Further, the device 102 may determine the list using multiple techniques. In a first example, the device 102 may determine the list to include all running processes at the time that the hibernation command is received. In a second example, the device 102 may determine the list to include running processes that have been accessed by the user within a period of time prior to the hibernation command being received (e.g., processes that the user opened within the last five minutes). In a third example, the device 102 may determine the list to include running processes using criteria that indicate that the user has used the process extensively, such as processes that have received a number of inputs above a threshold (e.g., user interacted with the process extensively), have been running for a period of time above a threshold (e.g., process has continued to run over a long time), have been displayed to the user for a period of time above a threshold (e.g., process has been displayed on the screen a long time) and/or are associated with a quantity of data above a threshold (e.g., process may access a lot of data in volatile memory). However, the disclosure is not limited thereto and the device 102 may determine the list using other techniques. For example, the device 102 may determine the list to include non-running processes that are frequently accessed by the user without departing from the disclosure.

Additionally or alternatively, the device may determine the list based on the weighting. Thus, the device 102 may determine a weighting associated with each of the running processes and may narrow the list based on the weighting. For example, the device 102 may associate a more recently accessed process with a higher weight than a less recently accessed process. Thus, a first process accessed 20 seconds prior to the hibernation command may be associated with a first weight while a second process accessed 2 minutes prior to the hibernation command may be associated with a second weight lower than the first weight. Additionally or alternatively, the device 102 may associate a first process that has been running for ten minutes with the first weight while a second process that has been running for two minutes may be associated with the second weight.

Based on the individual weights indicating a priority of the processes, the device 102 may select processes to include in the list of processes to be preloaded after hibernation. As a first example, the device 102 may select processes that have a weight above a threshold. Thus, if many processes are running on the device 102 and have weights above the threshold, the device 102 may select a large number of processes, whereas if few processes are running on the device 102 and have weights above the threshold, the device 102 may select a small number of processes. As a second example, the device 102 may select a fixed number of processes in order of individual weights. Thus, the device 102 may select the five processes associated with the five highest weights, regardless of the weight. In a third example, the device 102 may select a variable number of processes in order of weight so that the preloading is performed in a fixed period of time. For example, a first process may have a first weight and correspond to a first amount of data while a second process may have a second weight lower than the first weight and may correspond to a second amount of data. The device 102 may determine that, based on the first amount of data and the second amount of data, the preloading would take longer than the fixed amount of time and may select the first process but not the second process. The present disclosure is not limited thereto and the device 102 may select the processes using other techniques without departing from the disclosure.

Figure 9:
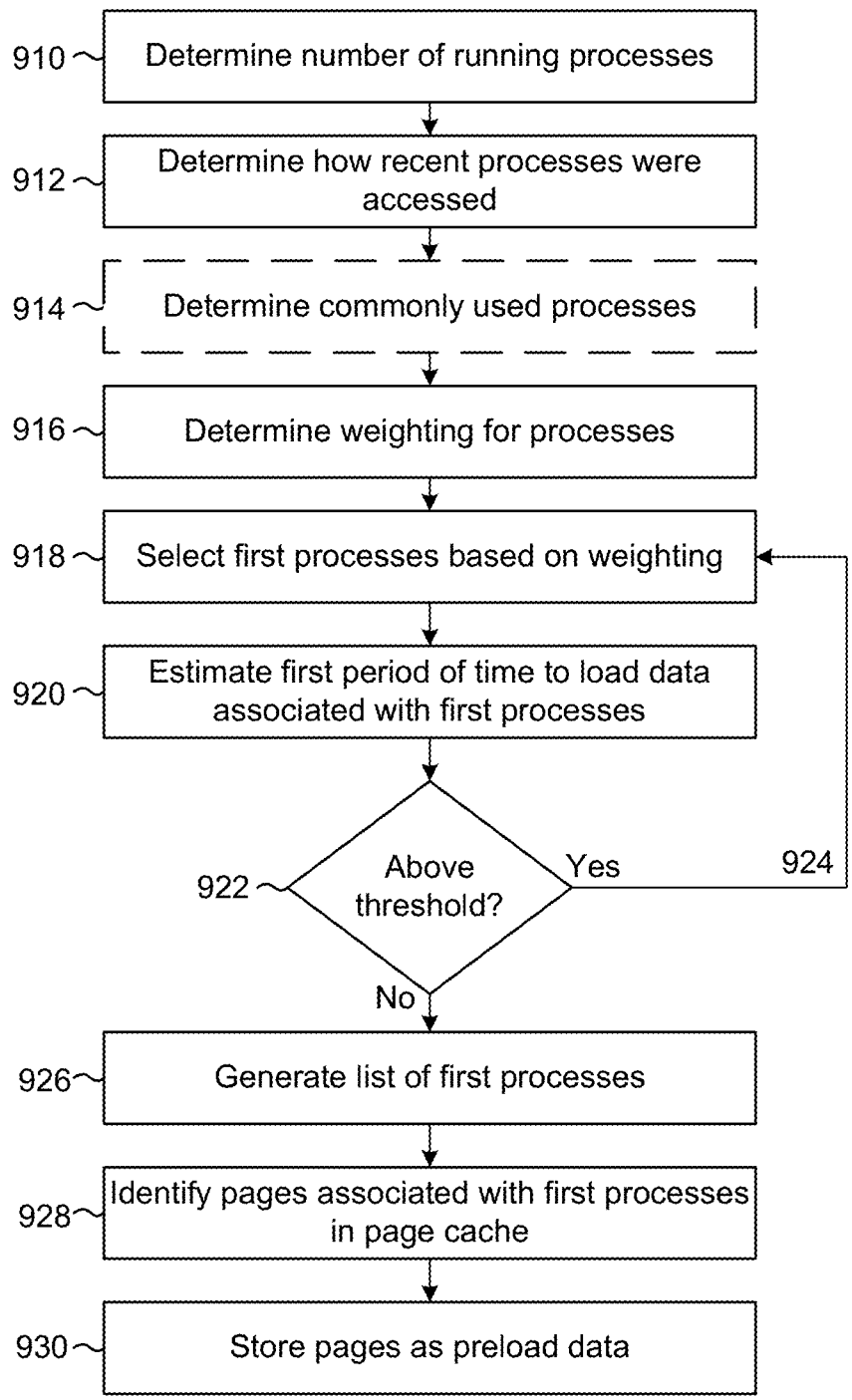
FIG. 9 is a flowchart conceptually illustrating an example method for determining an amount of preload data according to embodiments of the present disclosure.

FIG. 9 is a flowchart conceptually illustrating an example method for determining an amount of preload data according to embodiments of the present disclosure. As illustrated in FIG. 9, the device 102 may determine (910) a number of running processes, may determine (812) how recent processes were accessed, may optionally determine (914) commonly used processes based on user history or other data, and may determine (916) a weighting for the processes. The device 102 may select (918) first processes based on weighting, may estimate (920) a first period of time to load data associated with the first processes and may determine (922) if the first period of time is above a threshold. If the first period of time is above the threshold, the device 102 may loop (924) to step 918 and select a reduced number of first processes based on the weighting. If the first period of time is below the threshold, the device 102 may generate (926) a list of the first processes, may identify (928) pages associated with the first processes in the page cache and may store (930) the pages as preload data in the snapshot.

As discussed above with regard to FIGS. 2A-3C, the device 102 may reduce power consumption by entering a suspended state or a hibernation state. For example, the suspended state may consume a first amount of power (e.g., 650 mA) while the hibernation state may consumer a second amount of power (e.g., 100 mA) that is lower than the first amount of power. Thus, to improve battery life of the device 102 and reduce overall power consumption, the device 102 may enter the hibernation state whenever the device is idle. However, each time the device 102 enters the hibernation state the device 102 may store data from volatile memory to a snapshot in nonvolatile memory, such as solid state storage like embedded multimedia card (eMMC), that has a finite lifetime expectancy. For example, the nonvolatile memory may write to an individual sector a fixed number of times (e.g., 2,000 times) before receiving read/write errors associated with the sector, although each individual sector is different. To prolong a useful life of the nonvolatile memory, the nonvolatile memory may include a controller that performs wear leveling to evenly distribute read/write commands throughout the sectors. However, after entering the hibernation state a number of times, an amount of sectors receiving read/write errors rises above a threshold and the nonvolatile memory reaches its finite lifetime expectancy.

In order to prolong the useful life of the nonvolatile memory, and therefore reduce power consumption of the device 102 by enabling the device 102 to enter the hibernation state over a longer period of time, the device 102 may limit a frequency that the device 102 enters the hibernation state. For example, after a first number of "cumulative hibernations" (e.g., the device 102 enters the hibernation state a first number of times over a total lifetime of the device 102), the device 102 may limit the device to a fixed number of "session hibernations" (e.g., the device 102 enters the hibernation state a maximum of the fixed number of times over a period of time).

The device 102 may determine a total number of hibernations (e.g., total number of times that the device 102 entered the hibernation state over the total lifetime of the device 102) and may compare the total number of hibernations to one or more cumulative thresholds. For each of the cumulative thresholds, the device 102 may determine a corresponding session threshold (e.g., maximum number of times that the device 102 may enter the hibernation state for each session or interval). For example, the device 102 may determine a first cumulative threshold (e.g., 50% of lifetime expectancy) associated with a first session threshold (e.g., entering the hibernation state a maximum of 10 times per day) and a second cumulative threshold (e.g., 75% of lifetime expectancy) associated with a second session threshold (e.g., entering the hibernation state a maximum of 5 times per day). Thus, the device 102 may enter the hibernation state an unlimited amount of times per day until the total number of hibernations is above the first cumulative threshold (e.g., total number of hibernations >50% of lifetime expectancy), at which point the device 102 may enter the hibernation state up to the first session threshold (e.g., a maximum of 10 hibernations per day). Once the device 102 reaches the first session threshold (e.g., 10 hibernations in one day), the device 102 may enter the suspended state instead of the hibernation state until an expiration of the session (e.g., until the next day). After the total number of hibernations is above the second cumulative threshold (e.g., total number of hibernations >75% of lifetime expectancy), the device 102 may enter the hibernation state up to the second session threshold (e.g., a maximum of 5 hibernations per day). Once the device 102 reaches the second session threshold (e.g., 5 hibernations in one day), the device 102 may enter the suspended state instead of the hibernation state until an expiration of the session (e.g., until the next day).

The device 102 may compare the total number of hibernations to any number of cumulative thresholds. In some examples, the device 102 may include a cumulative counter that increments each time the device 102 enters the hibernation state, such that an output of the cumulative counter corresponds to the total number of hibernations. Similarly, the device 102 may include a session counter that increments each time the device 102 enters the hibernation state and resets to zero at the end of the session, such that an output of the session counter corresponds to the number of hibernations per session.

The session threshold may correspond to fixed intervals of time (e.g., hourly, daily, weekly, etc.) and/or to variable intervals of time (e.g., each time the device 102 is on battery power, resetting when the device 102 is being charged or each time the device 102 is powered on, resetting when the device 102 is powered off). Thus, a number of times that the device 102 enters the hibernation state may vary over time and the device 102 may determine an interval associated with the session based on usage of the device 102. For example, if the device 102 is charged once a week or less, the device 102 may associate the session threshold with a weekly interval, thus limiting the device 102 to hibernating a maximum number of times per week to reduce power consumption and prolong the battery life. In contrast, if the device 102 is charged twice a week or more, the device 102 may base the session threshold on the frequency of charging, thus limiting the device 102 to hibernating a maximum number of times each time that the device 102 runs on battery power. This may avoid a situation where a battery of the device 102 lasts a first duration early in the week (when the device 102 enters the hibernation state) and a second duration later in the week (when the device 102 has exceeded the session threshold and enters the suspended state instead, consuming more power).

FIGS. 10A-10D illustrate examples of extending a length of time before failure by using thresholds according to embodiments of the present disclosure. As illustrated in FIG. 10A, the device 102 may not include cumulative thresholds and/or session thresholds and may perform unlimited hibernations for the lifetime of the device 102, as indicated by a first threshold chart 1000. As the device 102 performs unlimited hibernations, a first hibernation chart 1002 illustrates that the device 102 hibernates at a first rate until a total number of hibernations is equal to a life expectancy of the nonvolatile memory. Once the total number of hibernations exceeds the life expectancy, the device 102 must enter the suspended state instead of the hibernation state, increasing a power consumption of the device 102 and therefore reducing battery life. While the number of hibernations over time may vary, the hibernation chart 1002 illustrates the first rate as a constant value for ease of explanation.

As illustrated in FIG. 10B, the device 102 may include a first cumulative threshold (e.g., at 50% of life expectancy) and a corresponding first session threshold (e.g., 10 hibernations per session), as indicated by a second threshold chart 1010. A second hibernation chart 1012 illustrates that the device 102 hibernates at a first rate until a total number of hibernations is equal to the first cumulative threshold (e.g., 50% of the expected life expectancy) and at a second rate thereafter until the total number of hibernations is equal to the life expectancy of the nonvolatile memory. The second rate may be limited by the first session threshold such that the device 102 may enter the hibernation state a maximum number of times (e.g., 10) per session. As illustrated in the second hibernation chart 1012, the device 102 continues to hibernate for a longer period of time, compared to the first hibernation chart 1002, before the total number of hibernations exceeds the life expectancy of the nonvolatile memory.

As illustrated in FIG. 10C, the device 102 may include a first cumulative threshold (e.g., at 50% of life expectancy) and a corresponding first session threshold (e.g., 10 hibernations per session) and a second cumulative threshold (e.g., at 75% of life expectancy) and a corresponding second session threshold (e.g., 5 hibernations per session), as indicated by a third threshold chart 1020. A third hibernation chart 1022 illustrates that the device 102 hibernates at a first rate until a total number of hibernations is equal to the first cumulative threshold (e.g., 50% of the life expectancy), at a second rate until the total number of hibernations is equal to the second cumulative threshold (e.g., 75% of the life expectancy), and at a third rate thereafter until the total number of hibernations is equal to the life expectancy of the nonvolatile memory. The second rate may be limited by the first session threshold such that the device 102 may enter the hibernation state a first maximum number of times (e.g., 10) per session and the third rate may be limited by the second session threshold such that the device 102 may enter the hibernation state a second maximum number of times per session that is lower than the first maximum (e.g., 5). As illustrated in the third hibernation chart 1022, the device 102 continues to hibernate for a longer period of time, compared to the second hibernation chart 1012, before the total number of hibernations exceeds the life expectancy of the nonvolatile memory.

In some examples, the device 102 may set a maximum number of hibernations per session to a value of one to maximize the period of time that the device 102 may hibernate at least once per session. As illustrated in FIG. 10D, the device 102 may include a first cumulative threshold (e.g., at 50% of life expectancy) and a corresponding first session threshold (e.g., 10 hibernations per session) and a second cumulative threshold (e.g., at 75% of life expectancy) and a corresponding second session threshold (e.g., 1 hibernation per session), as indicated by a fourth threshold chart 1030. A fourth hibernation chart 1022 illustrates that the device 102 hibernates at a first rate until a total number of hibernations is equal to the first cumulative threshold (e.g., 50% of the life expectancy), at a second rate until the total number of hibernations is equal to the second cumulative threshold (e.g., 75% of the life expectancy), and at a third rate thereafter until the total number of hibernations is equal to the life expectancy of the nonvolatile memory. The second rate may be limited by the first session threshold such that the device 102 may enter the hibernation state a first maximum number of times (e.g., 10) per session and the third rate may be limited by the second session threshold such that the device 102 may enter the hibernation state once per session. As illustrated in the fourth hibernation chart 1032, the device 102 continues to hibernate for a longer period of time, compared to the third hibernation chart 1022, before the total number of hibernations exceeds the life expectancy of the nonvolatile memory.

Figure 11:
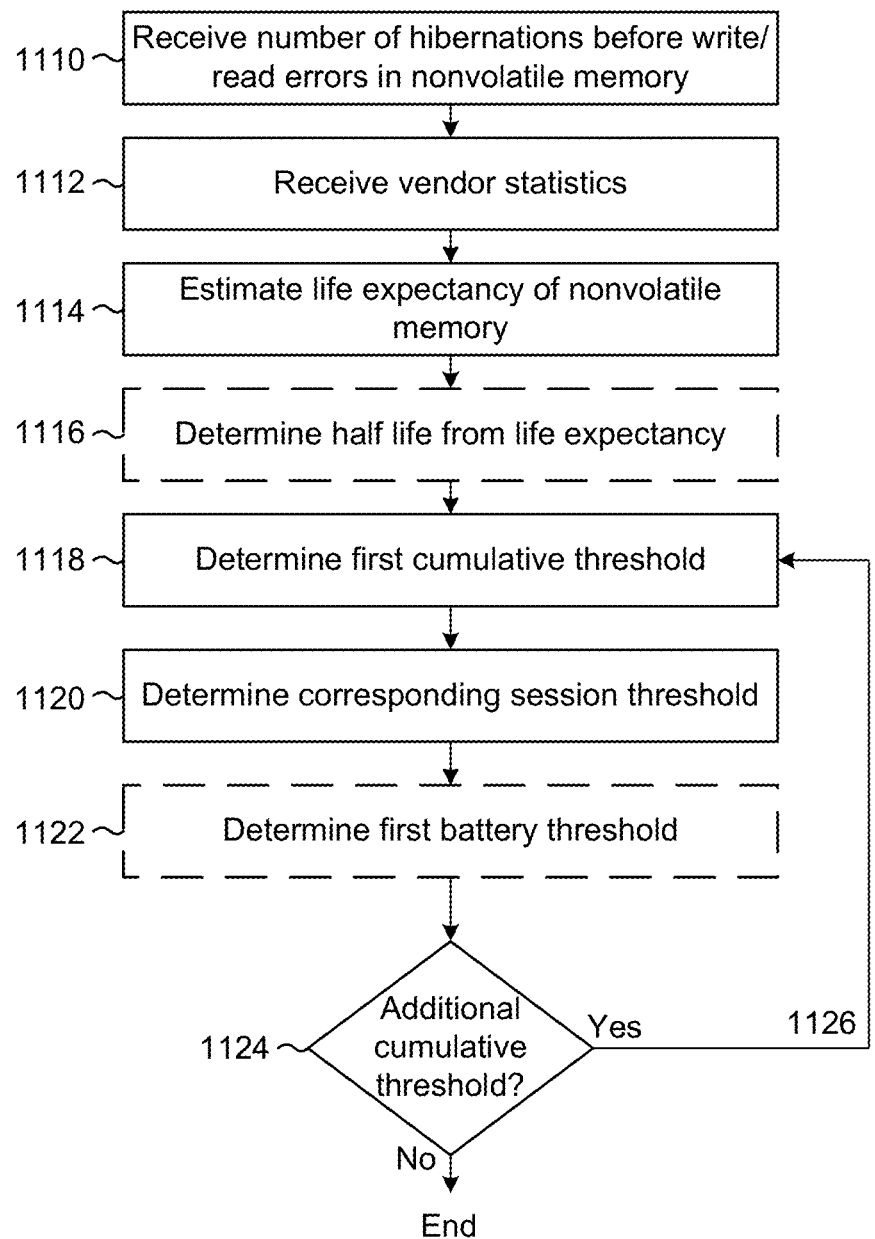
FIG. 11 is a flowchart conceptually illustrating an example method for determining cumulative thresholds and corresponding session thresholds according to embodiments of the present disclosure.

FIG. 11 is a flowchart conceptually illustrating an example method for determining cumulative thresholds and corresponding session thresholds according to embodiments of the present disclosure. As illustrated in FIG. 11, the device 102 may receive (1110) an estimated number of hibernations before write/read errors occur in nonvolatile memory, which may be determined during testing of several types of nonvolatile memory devices. The device 102 may receive (1112) vendor statistics associated with a particular type of nonvolatile memory device from a particular vendor and may estimate (1114) a life expectancy of the nonvolatile memory based on the estimated number of hibernations before errors occur and the vendor statistics. Optionally, the device 102 may determine (1116) a half-life from the life expectancy and may determine cumulative thresholds based on the half-life. The device 102 may determine (1118) a first cumulative threshold and determine (1120) a corresponding session threshold that corresponds to the first cumulative threshold.

Optionally, the device 102 may determine (1122) a first battery threshold corresponding to the first cumulative threshold. The battery threshold may be a high threshold (e.g., 75% battery life) where the device 102 may not enter the hibernation state as battery conservation is not an issue, or the battery threshold may be a low threshold (e.g., 15-20% battery life) where the device 102 may not enter the hibernation state as there isn't enough battery life to perform hibernation. As a first example of the high threshold, if the device 102 determines that a charge of the battery is above the first battery threshold, the device 102 may determine not to hibernate and may enter a suspension state instead, as battery life is not yet an issue. Thus, the device 102 may enter a hibernation state when the charge of the battery falls below the first battery threshold and may instead enter a suspended state when the charge of the battery is above the first battery threshold. As a second example of the low threshold, the device 102 may determine that the charge of the battery is below the first battery threshold and may determine not to hibernate, as the device 102 may exhaust the remaining battery life while entering the hibernation state. For example, entering the hibernation state may consume a variable amount of battery life (e.g., roughly 10%) and if the battery is exhausted prior to entering the hibernation state, data may be lost or not accurately stored. In addition, the device 102 may be unresponsive to the user and unable to indicate that there is low battery during the hibernation state. Thus, the device 102 may enter the hibernation state when the charge of the battery is above the first battery threshold and may enter the suspended state when the charge of the battery is below the first battery threshold.

The device 102 may determine (1124) whether to generate additional cumulative thresholds. If the device 102 determines to generate additional cumulative threshold(s), the device 102 may loop (1126) to step 1118 and perform steps 1118-1122 for each of the additional cumulative threshold(s). If the device 102 determines not to generate additional cumulative threshold(s), the process may end.

Figure 12:
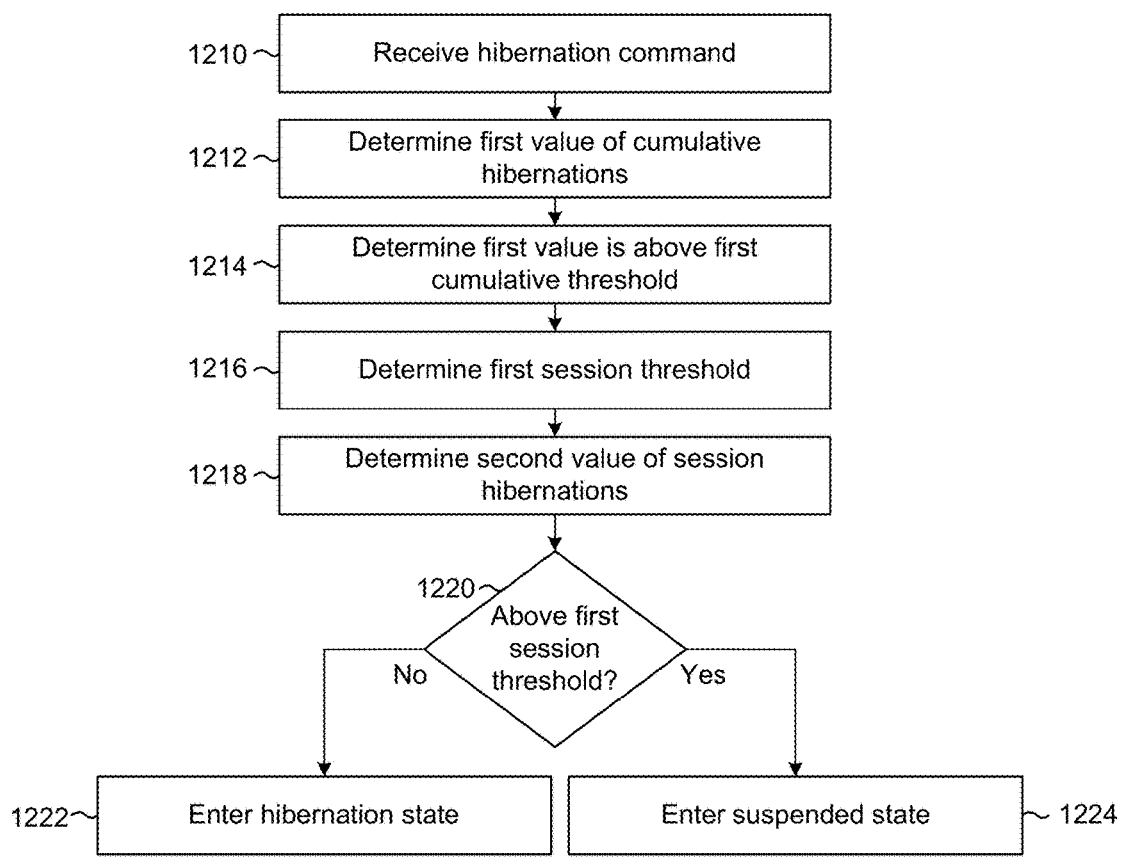
FIG. 12 is a flowchart conceptually illustrating an example method for determining whether to place a device in a hibernation state according to embodiments of the present disclosure.

FIG. 12 is a flowchart conceptually illustrating an example method for determining whether to place a device in a hibernation state according to embodiments of the present disclosure. As illustrated in FIG. 12, the device 102 may receive (1210) a hibernation command, may determine (1212) a first value of cumulative hibernations and may determine (1214) that the first value is above a first cumulative threshold. The device 102 may determine (1216) a first session threshold corresponding to the first cumulative threshold, determine (1218) a second value of session hibernations and may determine (1220) whether the second value is above the first session threshold. If the second value is below the first session threshold, the device 102 may enter (1222) the hibernation state. If the second value is above the first session threshold, the device 102 may enter (1224) the suspended state.

Figure 13:
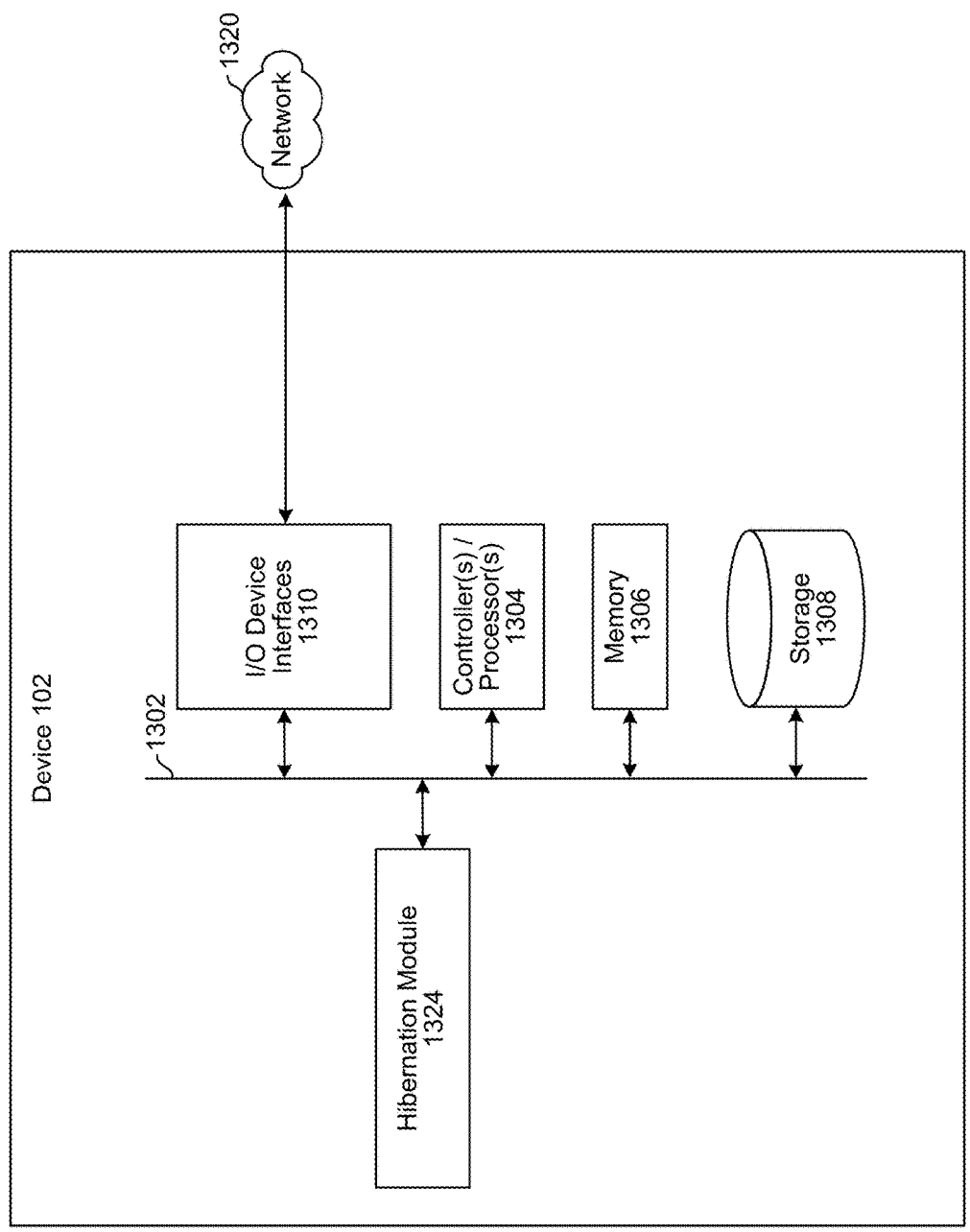
FIG. 13 is a block diagram conceptually illustrating example components of a system according to embodiments of the present disclosure.

FIG. 13 illustrates a block diagram conceptually illustrating example components of a system 100 including a device 102. Other components not illustrated may also be included in the device 102 without departing from the disclosure. In operation, the system 100 may include computer-readable and computer-executable instructions that reside in storage 1308 on the device 102. The device 102 may be a mobile electronic device including a battery. Examples of mobile electronic devices may include computers (e.g., a laptop, a tablet or the like), portable devices (e.g., a camera (such as a 360° video camera), smart phone, tablet or the like), media devices or the like. The device 102 may also be a component of any of the abovementioned devices or systems.

As illustrated in FIG. 13, the device 102 may include an address/data bus 1302 for conveying data among components of the device 102. Each component within the device 102 may also be directly connected to other components in addition to (or instead of) being connected to other components across the bus 1302.

The device 102 may include one or more controllers/processors 1304 comprising one-or-more central processing units (CPUs) for processing data and computer-readable instructions and a memory 1306 for storing data and instructions. The memory 1306 may include volatile random access memory (RAM), non-volatile read only memory (ROM), non-volatile magnetoresistive (MRAM) and/or other types of memory. The device 102 may also include a data storage component 1308 for storing data and processor-executable instructions. The data storage component 1308 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 1310.

The device 102 includes input/output device interfaces 1310. A variety of components may be connected to the device 102 through the input/output device interfaces 1310. The input/output device interfaces 1310 may be configured to operate with a network 1320, for example a wireless local area network (WLAN) (such as WiFi), Bluetooth, ZigBee and/or wireless networks, such as a Long Term Evolution (LTE) network, WiMAX network, 3G network, etc. The network 1320 may include a local or private network or may include a wide network such as the internet. Devices may be connected to the network 1320 through either wired or wireless connections.

The input/output device interfaces 1310 may also include an interface for an external peripheral device connection such as universal serial bus (USB), FireWire, Thunderbolt, Ethernet port or other connection protocol that may connect to networks 1320. The input/output device interfaces 1310 may also include a connection to an antenna (not shown) to connect one or more networks 1320 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102 further includes a hibernation module 1324, which may comprise processor-executable instructions stored in storage 1308 to be executed by controller(s)/processor(s) 1304 (e.g., software, firmware), hardware, or some combination thereof. For example, components of the hibernation module 1324 may be part of a software application running in the foreground and/or background on the device 102. The hibernation module 1324 may control the device 102 as discussed above, for example with regard to FIGS. 1A, 1B, 5, 6, 8, 9, 11 and/or 12. Some or all of the controllers/modules of the hibernation module 1324 may be executable instructions that may be embedded in hardware or firmware in addition to, or instead of, software. In one embodiment, the device 102 may operate using an Android operating system (such as Android 4.3 Jelly Bean, Android 4.4 KitKat or the like), an Amazon operating system (such as FireOS or the like), or any other suitable operating system.

Executable computer instructions for operating the device 102 and its various components may be executed by the controller(s)/processor(s) 1304, using the memory 1306 as temporary "working" storage at runtime. The executable instructions may be stored in a non-transitory manner in non-volatile memory 1306, storage 1308, or an external device. Alternatively, some or all of the executable instructions may be embedded in hardware or firmware in addition to or instead of software.

The components of the device 102, as illustrated in FIG. 13, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving a first command that causes a device to enter a hibernation state;
in response to receiving the first command:
determining first data that is associated with one or more processes executing on the device,
determining a first portion of the first data that is to be preloaded from nonvolatile memory to volatile memory when the device subsequently exits the hibernation state,
transferring the first portion of the first data and a second portion of the first data from the volatile memory to the nonvolatile memory, and
entering the hibernation state;
receiving a second command that causes the device to exit the hibernation state and be in an active state;
in response to receiving the second command:
preloading the first portion of the first data from the nonvolatile memory to the volatile memory,
displaying, using a first process and prior to transferring any of the second portion of the first data from the nonvolatile memory to the volatile memory, a first rendering corresponding to the first portion of the first data on a screen, and
entering the active state, wherein the device is configured to interact with a user in the active state.

2. The computer-implemented method of claim 1, further comprising, after entering the active state:
receiving a third command to activate a second process;
determining that a second rendering had been previously displayed using the second process;
loading a second portion of the first data from the nonvolatile memory to the volatile memory, the second portion corresponding to the second rendering; and
displaying, using the second process, the second rendering on the screen of the device.

3. The computer-implemented method of claim 1, further comprising:
determining that the first process was last accessed at a first time;
determining a first weight associated with the first time, the first weight determined by calculating a first length of time from the first time to a current time;
determining that a second process was last accessed at a second time different than the first time;
determining a second weight associated with the second time that is lower than the first weight, the second weight determined by calculating a second length of time from the second time to the current time;
determining that the first weight is above a threshold;
determining that the first portion of the first data is to be preloaded from the nonvolatile memory to the volatile memory based at least in part on the first weight being above the threshold
determining that the second weight is below the threshold; and
determining that the second portion of the first data is not to be preloaded from the nonvolatile memory to the volatile memory based at least in part on the second weight being below the threshold.

4. A computer-implemented method, comprising:
  determining that a device is to transition from a second state to in a first state, the first state disabling power to volatile memory and consuming less power than the second state;
  in response to determining that the device is to transition from the second state to the first state:
    determining first data that is associated with one or more processes executing on the device,
    determining a first portion of the first data that is to be preloaded from nonvolatile memory to the volatile memory when the device subsequently transitions from the first state to the second state,
    transferring the first portion of the first data and a second portion of the first data from the volatile memory to the nonvolatile memory, and
    operating the device in the first state;
  determining that the device is to transition from the first state to the second state;
  in response to determining that the device is to transition from the first state to the second state:
    preloading the first portion of the first data from the nonvolatile memory to the volatile memory,
    displaying, using a first process and prior to transferring any of the second portion of the first data from the nonvolatile memory to the volatile memory, a first user interface corresponding to the first portion of the first data, and
    operating the device in the second state.

5. The computer-implemented method of claim 4, further comprising, prior to transferring the second portion of the first data from the nonvolatile memory to the volatile memory:
  receiving a command associated with a second process on the device;
  determining that a second user interface had been previously displayed using the second process;
  determining a second portion of the first data that corresponds to the second user interface;
  determining that the second portion of the first data is not loaded in the volatile memory;
  transferring the second portion of the first data from the nonvolatile memory to the volatile memory; and
  displaying, using the second process, the second user interface.

6. The computer-implemented method of claim 4, further comprising:
  determining that the first process was last accessed at a first time;
  determining a first weight associated with the first time;
  determining that a second process was last accessed at a second time different than the first time;
  determining a second weight associated with the second time that is lower than the first weight;
  determining that the first weight is above a threshold;
  determining that the first portion of the first data is to be preloaded from the nonvolatile memory to the volatile memory based at least in part on the first weight being above the threshold;
  determining that the second weight is below the threshold; and
  determining that the second portion of the first data is not to be preloaded from the nonvolatile memory to the volatile memory based at least in part on the second weight being below the threshold.

7. The computer-implemented method of claim 4, further comprising:
  estimating a first period of time associated with retrieving a first data set including the first portion of the first data and the second portion of the first data;
  determining that the first period of time is above a threshold;
  estimating a second period of time associated with retrieving a second data set including the first portion of the first data and excluding the second portion of the first data;
  determining that the second period of time is below the threshold; and
  determining that the second data set is to be preloaded from the nonvolatile memory to the volatile memory based at least in part on the first period of time being above the threshold and second period of time being below the threshold.

8. The computer-implemented method of claim 4, wherein operating the device in the first state further comprises:
  disabling power to a first peripheral on the device; and
  disabling power to a central processing unit on the device.

9. The computer-implemented method of claim 4, further comprising, subsequent to displaying the first user interface and operating the device in the second state:
  transferring the second portion of the first data from the nonvolatile memory to the volatile memory, and
  executing at least one of the one or more processes using the second portion of the first data.

10. A system, comprising:
  a device including at least one processor; and
  memory including instructions operable to be executed by the at least one processor to cause the device to:
    determine that the device is to transition from a second state to a first state, the first state disabling power to volatile memory and consuming less power than a second state;
    in response to determining that the device is to transition from the second state to the first state:
      determine first data that is associated with one or more processes executing on the device,
      determine a first portion of the first data that is to be preloaded from nonvolatile memory to the volatile memory when the device subsequently transitions from the first state to the second state,
      transfer the first portion of the first data and a second portion of the first data from the volatile memory to the nonvolatile memory, and
      operate the device in the first state;
    determine that the device is to transition from the first state to the second state;
    in response to determining that the device is to transition from the first state to the second state:
      preload the first portion of the first data from the nonvolatile memory to the volatile memory,
      display, using a first process and prior to transferring any of the second portion of the first data from the nonvolatile memory to the volatile memory, a first user interface corresponding to the first portion of the first data, and
      operate the device in the second state.

11. The system of claim 10, wherein the memory further comprises instructions that, when executed by the at least one processor, further cause the system to, prior to transferring the second portion of the first data from the nonvolatile memory to the volatile memory;
  receive a command associated with a second process;

determine that a second user interface had been previously displayed using the second process;
determine a second portion of the first data that corresponds to the second user interface;
determine that the second portion of the first data is not loaded in the volatile memory;
transfer the second portion of the first data from the nonvolatile memory to the volatile memory; and
display, using the second process, the second user interface.

12. The system of claim 10, wherein the memory further comprises instructions that, when executed by the at least one processor, further cause the system to:
determine that the first process was last accessed at a first time;
determine a first weight associated with the first time;
determine that a second process was last accessed at a second time different than the first time;
determine a second weight associated with the second time that is lower than the first weight;
determine that the first weight is above a threshold;
determine that the first portion of the first data is to be preloaded from the nonvolatile memory to the volatile memory based at least in part on the first weight being above the threshold;
determine that the second weight is below the threshold; and
determine that the second portion of the first data is not to be preloaded from the nonvolatile memory to the volatile memory based at least in part on the second weight being below the threshold.

13. The system of claim 10, wherein the memory further comprises instructions that, when executed by the at least one processor, further cause the system to:
estimate a first period of time associated with retrieving a first data set including the first portion of the first data and the second portion of the first data;
determine that the first period of time is above a threshold;
estimate a second period of time associated with retrieving a second data set including the first portion of the first data and excluding the second portion of the first data;
determine that the second period of time is below the threshold; and
determine that the second data set is to be preloaded from the nonvolatile memory to the volatile memory based at least in part on the first period of time being above the threshold and second period of time being below the threshold.

14. The system of claim 10, wherein the memory further comprises instructions that, when executed by the at least one processor, further cause the system to:
disable power to a first peripheral on the device; and
disable power to a central processing unit on the device.

15. The system of claim 10, wherein the memory further comprises instructions that, when executed by the at least one processor, further cause the system to:
determine that the device is to transition from the second state to the first state in response to receiving a first command; and
determine that the device is to transition from the first state to the second state in response to receiving a second command.

16. The system of claim 10, wherein the memory further comprises instructions that, when executed by the at least one processor, further cause the system to:
display, using a second process, a second user interface corresponding to the second portion of the first data.

17. The system of claim 10, wherein the memory further comprises instructions that, when executed by the at least one processor, further cause the system to:
receive a first command indicating the device is to transition from the second state to the first state;
determine that the first process is executing on the device at a time the first command is received; and
determine the first portion of the first data that is to be preloaded from the nonvolatile memory to the volatile memory based at least in part on determining that the first process is executing on the device at the time the first command is received.

18. The system of claim 10, wherein the memory further comprises instructions that, when executed by the at least one processor, further cause the system to:
receive a first command indicating the device is to transition from the second state to the first state;
determine that the first process was executing on the device within a predetermined period of time before the first command was received; and
determine the first portion of the first data that is to be preloaded from the nonvolatile memory to the volatile memory based at least in part on determining that the first process was executing on the device within the predetermined period of time.

19. The system of claim 10, wherein the memory further comprises instructions that, when executed by the at least one processor, further cause the system to:
receive a first command indicating the device is to transition from the second state to the first state;
determine that an amount of usage of the first process exceeded a threshold criterion; and
determine the first portion of the first data that is to be preloaded from the nonvolatile memory to the volatile memory based at least in part on determining that the amount of usage of the first process exceeded the threshold criterion.

20. The system of claim 10, wherein the memory further comprises instructions that, when executed by the at least one processor, further cause the system to:
receive a list of virtual memory areas corresponding to the first process; and
determine, using the list of virtual memory areas, the first portion of the first data that is to be preloaded from the nonvolatile memory to the volatile memory.

21. The system of claim 10, wherein the memory further comprises instructions that, when executed by the at least one processor, further cause the system to, subsequent to displaying the first user interface and operating the device in the second state:
transfer the second portion of the first data from the nonvolatile memory to the volatile memory, and
execute at least one of the one or more processes using the second portion of the first data.

* * * * *